United States Patent
Sugihara

(12) United States Patent     (10) Patent No.: US 7,409,421 B2
Sugihara     (45) Date of Patent: Aug. 5, 2008

(54) PROGRAM DRAWING-UP APPARATUS, PROGRAM PROVIDING SYSTEM, METHODS TO BE USED WITH THE SAME, COMPUTER PROGRAMS TO BE USED WITH THE SAME AND RECORDING MEDIUM STORING SUCH COMPUTER PROGRAMS

(75) Inventor: Motooki Sugihara, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 801 days.

(21) Appl. No.: 10/617,352

(22) Filed: Jul. 11, 2003

(65) Prior Publication Data
US 2004/0039793 A1    Feb. 26, 2004

(30) Foreign Application Priority Data
Jul. 18, 2002    (JP)    ............................. 2002-209770

(51) Int. Cl.
*G06F 15/16*    (2006.01)

(52) U.S. Cl. ....................... 709/203; 709/217; 709/246; 725/24; 725/32; 725/42; 725/46; 725/56

(58) Field of Classification Search ................. 709/203, 709/217, 246; 725/32, 46, 24, 42, 56; 715/733, 715/744
See application file for complete search history.

(56) References Cited

U.S. PATENT DOCUMENTS

| | | | | |
|---|---|---|---|---|
| 5,283,639 | A | | 2/1994 | Esch et al. ..................... 348/6 |
| 5,355,472 | A | * | 10/1994 | Lewis ......................... 707/101 |
| 5,444,499 | A | * | 8/1995 | Saitoh ......................... 348/734 |
| 5,479,266 | A | * | 12/1995 | Young et al. ................... 386/83 |
| 5,479,268 | A | * | 12/1995 | Young et al. ................... 386/83 |
| 5,534,911 | A | * | 7/1996 | Levitan ........................ 725/46 |
| 5,564,088 | A | * | 10/1996 | Saitoh ....................... 455/186.1 |
| 5,758,257 | A | * | 5/1998 | Herz et al. ................... 725/116 |

(Continued)

FOREIGN PATENT DOCUMENTS

EP     1 175 094     1/2002

(Continued)

OTHER PUBLICATIONS

European Search Report Apr. 5, 2005.

(Continued)

*Primary Examiner*—Michael Won
(74) *Attorney, Agent, or Firm*—Kratz, Quintos & Hanson, LLP

(57) ABSTRACT

A program drawing-up apparatus can provide information effectively and efficiently. The program drawing-up apparatus (2) comprises a program control device (3) and a narration synthesizer device (4). The program control device (3) has a delivery request acquisition section for acquiring a delivery request from a client apparatus (6), a contents data retrieval section for retrieving contents data and a program drawing-up section for drawing up a program showing the sequence of delivery of the contents data and the auxiliary data on the basis of the delivery request. The narration synthesizer device (4) has a narration synthesizing section for synthetically generating narration data to be delivered in combination with contents data. Information can be provided effectively because contents can be delivered with one or more than one narrations added thereto.

9 Claims, 22 Drawing Sheets

U.S. PATENT DOCUMENTS

| | | | | |
|---|---|---|---|---|
| 5,945,988 | A * | 8/1999 | Williams et al. | 715/747 |
| 6,006,257 | A | 12/1999 | Slezak | 709/219 |
| 6,133,909 | A * | 10/2000 | Schein et al. | 715/721 |
| 6,177,931 | B1 * | 1/2001 | Alexander et al. | 725/52 |
| 6,178,438 | B1 * | 1/2001 | Tschirhart et al. | 709/200 |
| 6,195,681 | B1 * | 2/2001 | Appleman et al. | 709/203 |
| 6,288,753 | B1 * | 9/2001 | DeNicola et al. | 348/586 |
| 6,300,880 | B1 * | 10/2001 | Sitnik | 340/825.25 |
| 6,637,029 | B1 * | 10/2003 | Maissel et al. | 725/46 |
| 6,683,611 | B1 * | 1/2004 | Cleveland | 345/471 |
| 6,693,652 | B1 * | 2/2004 | Barrus et al. | 715/838 |
| 6,694,482 | B1 * | 2/2004 | Arellano et al. | 715/500.1 |
| 6,721,954 | B1 * | 4/2004 | Nickum | 725/46 |
| 6,898,762 | B2 * | 5/2005 | Ellis et al. | 715/716 |
| 7,003,792 | B1 * | 2/2006 | Yuen | 725/46 |
| 7,032,236 | B1 * | 4/2006 | Ozkan et al. | 725/39 |
| 2002/0053085 | A1 | 5/2002 | Toguri | 725/51 |
| 2002/0097259 | A1 * | 7/2002 | Marshall et al. | 345/738 |
| 2002/0156911 | A1 * | 10/2002 | Croman et al. | 709/235 |
| 2003/0025832 | A1 * | 2/2003 | Swart et al. | 348/461 |
| 2003/0140083 | A1 * | 7/2003 | Watkins | 709/102 |
| 2004/0039793 | A1 * | 2/2004 | Sugihara | 709/217 |
| 2005/0066358 | A1 * | 3/2005 | Anderson et al. | 725/39 |

FOREIGN PATENT DOCUMENTS

| | | |
|---|---|---|
| JP | 8-328573 | 12/1996 |
| JP | 9-146579 | 6/1997 |
| JP | 10-31494 | 2/1998 |
| JP | 2000-267676 | 9/2000 |
| JP | 2001-128138 | 5/2001 |
| JP | 2002-116041 | 4/2002 |
| JP | 2002-165199 | 6/2002 |
| JP | 2002-182660 | 6/2002 |
| WO | WO 00/43899 | 7/2000 |
| WO | WO 01/33783 A1 | 5/2001 |
| WO | WO 01/77776 A2 | 10/2001 |
| WO | WO 02/32139 A2 | 4/2002 |
| WO | WO 02/39745 A1 | 5/2002 |

OTHER PUBLICATIONS

Office Action for JP 2002-209770 with English translation; Notification of Reason(s) of Refusal dated Apr. 1, 2008.

* cited by examiner

| USER NO. | PROFILE ATTRIBUTE | PROFILE DATA |
|---|---|---|
| 01234567 | NAME | TARO HANAZONO |
| 01234567 | AGE | 35 |
| 01234567 | SEX | MALE |
| 01234567 | POSTAL CODE | 359-8522 |
| 01234567 | ADDRESS 1 | SAITAMA PREFECTURE |
| 01234567 | ADDRESS 2 | TOKOROZAWA CITY |
| 01234567 | ADDRESS 3 | HANAZONO 4-×××× |
| 01234567 | TELEPHONE NO. | 042-990-×××× |
| 01234567 | CREDIT CARD NO. | ×××××××× |
| 01234567 | EQUIPMENT NO. | 76543210 |
| 01234567 | PASSWORD | 1A?2+9BT |
| 01234567 | HOBBY | FILM VIEWING |
| 01234567 | TASTE | JAPANESE MUSIC, NEWS |
| ... | ... | ... |

| REQUEST NO. | USER NO. | DATE | TIME |
|---|---|---|---|
| 1532 | 01234567 | 2001/6/1 | 20:30:00 |
| 1533 | 00319048 | 2001/6/1 | 20:30:05 |
| 1534 | 01328087 | 2001/6/1 | 20:30:07 |
| 1535 | 00900351 | 2001/6/1 | 20:30:10 |
| ... | | ... | ... |

| REQUEST NO. | REQUEST ATTRIBUTE | REQUEST DATA |
|---|---|---|
| 1532 | GENRE | NEW MUSIC |
| 1532 | AGE | EARLY 1970S |
| 1532 | SORT | SOLD COPIES OF RECORD (CD) |
| 1532 | NO. OF PLAYED TUNES | 30 |
| ... | ... | ... |

354

| USER NO. | ITEM | NO. OF TIMES |
|---|---|---|
| 01234567 | NEW MUSIC | 3 |
| 01234567 | IDOL | 2 |
| 01234567 | EARLY 1970S | 2 |
| 01234567 | 1980S | 1 |
| 01234567 | CABLE TV REQUEST | 2 |
| 01234567 | SOLD COPIES OF RECORD (CD) | 2 |
| ... | ... | ... |

| WORD NO. | PROFILE ATTRIBUTE | PROFILE DATA |
|---|---|---|
| 00010368 | PART OF SPEECH | NUMERAL |
| 00010368 | APPLICATION | YEAR |
| 00010368 | CLASSIFICATION | AD |
| 00010368 | CONTENTS | 1973 |
| 00010368 | TIME | 2" |
| 00010368 | DATA | word/numeral/yyyy1973.wav |
| ... | ... | ... |
| 00012065 | PART OF SPEECH | PRONOUN |
| 00012065 | APPLICATION | TITLE OF A TUNE |
| 00012065 | CLASSIFICATION | JAPAN, NEW MUSIC, ○○×× |
| 00012065 | CONTENTS | AAZZ |
| 00012065 | TIME | 2" |
| 00012065 | DATA | word/music_title/aazz.wav |
| ... | ... | ... |

| SENTENCE NO. | PROFILE ATTRIBUTE | PROFILE DATA |
|---|---|---|
| 00100038 | APPLICATION | INTRODUCTION OF A TUNE |
| 00100038 | CLASSIFICATION | ORDER, FIRST-RANKED |
| 00100038 | CONTENTS | THE FIRST-RANKED TUNE IS |
| 00100038 | TIME | 3" |
| 00100038 | DATA | phrase/music_intro/first.wav |
| ... | ... | ... |
| 00104362 | APPLICATION | DESCRIPTION OF A TUNE |
| 00104362 | CLASSIFICATION | AAZZ, ○○×× |
| 00104362 | CONTENTS | This tune is ○○××'s third single. |
| 00104362 | TIME | 15" |
| 00104362 | DATA | phrase/music_explain/aazz.wav |
| ... | ... | ... |

| TEMPLATE NO. | PROFILE ATTRIBUTE | PROFILE DATA |
|---|---|---|
| 00500045 | APPLICATION | DESCRIPTION OF MUSIC CONTENTS |
| 00500045 | CLASSIFICATION | RANKING, ORDER, GENRE, AGE, TITLE |
| 00500045 | TIME | 10" |
| 00500045 | DATA | template/content_explain/ranking4.xml |
| ... | ... | ... |

| CONTENT NO. | PROFILE ATTRIBUTE | PROFILE DATA |
|---|---|---|
| 00000101 | ID CENTER CONTROL NO. | 1101000000000101 |
| 00000101 | TITLE | AAZZ |
| 00000101 | ARTIST | ○○×× |
| 00000101 | DURATION | 3'37" |
| 00000101 | COUNTRY | JAPAN |
| 00000101 | RELEASE DATE | 1973/4/20 |
| 00000101 | SOLD COPIES OF RECORD | 500000 |
| 00000101 | COUPLING | 00000102 |
| 00000101 | ABSTRACT | The third single of ○○×× who made a great hit in 1973. |
| 00000101 | KEYWORD | YOUNG, LOVE, SEPARATION, TRAIN |
| 00000101 | TYPE | MUSIC WORK |
| 00000101 | GENRE | FOLK, NEW MUSIC |
| 00000101 | URL | rtsp://xxx.yyy.zzz/dirl/00000101.mp3 |
| 00000101 | CM CONTENTS | 01317708 |
| ... | ... | ... |

| PRODUCT NO. | DATE | TIME |
|---|---|---|
| 00002151 | 2001/6/1 | 20:35:00 |
| 00002152 | 2001/6/1 | 20:35:02 |
| 00002153 | 2001/6/1 | 20:35:05 |
| 00002154 | 2001/6/1 | 20:35:07 |
| 00002155 | 2001/6/1 | 20:35:12 |
| 00002156 | 2001/6/1 | 20:35:15 |
| 00002157 | 2001/6/1 | 20:35:18 |
| 00002158 | 2001/6/1 | 20:35:19 |
| ... | ... | ... |

| PRODUCT NO. | CONTENTS NO. | DESTINATION NO. | DESTINATION CLIENT NO. |
|---|---|---|---|
| 00002151 | 00000101 | 0004 | 01234567 |
| 00002152 | 00032461 | 0004 | 00837756 |
| 00002153 | 00008945 | 0004 | 07094834 |
| 00002154 | 00004973 | 0007 | 00049830 |
| 00002155 | 00000957 | 0007 | 00035890 |
| 00002156 | 00003168 | 0004 | 05120090 |
| 00002157 | 00034987 | 0005 | 00548713 |
| 00002158 | 00010845 | 0005 | 00324907 |
| ... | | ... | ... |

FIG.17

```
<?xml version ="1.0" encoding = "Shift - JIS"?>

<program request>
    <equipment No.>76543210</equipment No.>
    <date>2001/06/01</date>
    <time>20:30:00</time>
    <location type="own home"></location>
    <contents>
        <genre>new music</genre>
        <age>early 1970s</age>
        <sort>sold copies of record</sort>
        <No. of tunes>30</No. of tunes>
    </contents>
</program request>
```

```
<?xml version ="1.0" encoding = "Shift - JIS"?>

<retrieval request>
    <query>
        <country>Japan</country>
        <genre>new music</genre>
        <age>early 1970s</age>
        <sort>sold copies of record</sort>
    </query>
</retrieval request>
```

```
<?xml version ="1.0" encoding = "Shift - JIS"?>

<contents information no="1">
        <ID center control No.>1101000000000101</ID center control No.>
        <title>AAZZ</title>
        <artist>○○××</artist>
        <duration>3'37"</duration>
        <release date>1973/04/20</release date>
        <sold copies of record>500,000</sold copies of record>
        <abstract>Third single of ○○×× who made a great hit in 1973.
        Vocal is △△☐ having a sweet voice. Dramatic tune development.
        Arrangement is very impressive.
        </abstract>
        <URL>rtsp://xxx.yyy.zzz/dirl/00000101.mp3</URL>
    </contents information>

. . .

<contents information no="30">
        <ID center control No.>1101000000039801</ID center control No.>
        <title>CCDDD</title>
        <artist>△△××</artist>
        <duration>3'03"</duration>
        <release date>1971/01/20</release date>
        <sold copies of record>380,000</sold copies of record>
        <abstract>Received record Grand Prix of the year. A film with the
        same title was produced in 1973 by ○○Movie who made a great hit in 1973.
        </abstract>
        <URL>rtsp://xxx.yyy.zzz/dirl/00039801.mp3</URL>
    </contents information>

. . .

<contents information no="85">
        <ID center control No.>1101000000004138</ID center control No.>
        <title>EEFGG</title>
        <artist>☐☐××</artist>
        <duration>2'39"</duration>
        <release date>1973/03/20</release date>
        <sold copies of record>360,000</sold copies of record>
        <abstract>First single of ☐☐×× who made a great hit from start.
        At that time, ☐☐×× acted as curtain raiser of ○△× and △×○○
        played as back band. They were members of a very popular sound group.
        </abstract>
        <URL>rtsp://xxx.yyy.zzz/dirl/00004138.mp3</URL>
    </contents information>

```
<?xml version ="1.0" encoding = "Shift-JIS"?>

<narration request>
    <purpose>program prologue</purpose>
    <client information>
        <name>Hanazono</name>
        <sex>male</sex>
        <age>35</age>
        <address>Tokorozawa City, Saitama Prefecture</address>
        <date>2001/06/01</date>
        <time>20:30:00</time>
        <location type = "own home"> </location>
    <client information>
    <program information type = "music ranking">
        <ranking>sold copies of record</ranking>
        <country>Japan</country>
        <genre>new music</genre>
        <age>early 1970s</age>
        <No. of tunes>30</No. of tunes>
    </program information>
    <additional information>
        <society dete = "1970/03/14">Osaka Int'l Exhibition</society>
        <economy dete = "1971/08/16"> dollar shock </economy>
        <society dete = "1972/02/03">Sapporo Olympic Games
        </society>
        <incident dete = "1972/02/19">Asama Mountain Resort
        Outrage</incident>
        <politics dete = "1972/05/15">Return of Okinawa</politics>
        <politics dete = "1972/09/29">Recovery of Diplomatic
        Relations of Japan and China</politics>
        <economy dete = "1973/10/06">first oil shock</economy>
    </additional information>
</narration request>
```

```
<?xml version ="1.0" encoding = "Shift - JIS"?>
<narration request>
        <purpose> contents description </purpose>
        <contents information type = "music ranking">
                <ranking>sold copies of record</ranking>
                <country>Japan</country>
                <genre>new music</genre>
                <age>early 1970s</age>
                <rating>1</rating>
                <title>AAZZ</title>
                <artist>○○××</artist>
                <release date>1973/04/20</release date>
                <sold copies of record>500,000</sold copies of record>
                <abstract>Third single of ○○×× who made a great hit in
                1973. Vocal is △△□ having a sweet voice. Dramatic tune
                development. Arrangement is very impressive.
                </abstract>
        </contents information>
</narration request>
```

```
<?xml version ="1.0" encoding = "Shift - JIS"?>
<narration reception>
        <reception No.>00031549</reception No.>
        <necessary time period>00:00:20</necessary time period>
        <duration>00:00:35</duration>
        <server>narration server</server>
        <URL>rtsp://aaa.bbb.ccc/temp/narration30.mp3</URL>
</narration reception>
```

```
<?xml version ="1.0" encoding = "Shift - JIS"?>

<narration template type = "music contents description">
    <sentence type = "prologue">
        <clause type = "prologue" permission = "phrase"> </clause>
    </sentence>
    <sentence type = "music introduction">
        <clause imm = "This tune is">parts/ this_tune_is.wav</clause>
        <clause type = "country" permission = "word"> </clause>
        <clause type = "genre" permission = "word"> </clause>
        <clause type = "age" permission = "word"> </clause>
        <clause type = "ranking" permission = "word"> </clause>
        <clause type = "rating" permission = "word"> </clause>
        <clause type = "tune title" </clause>
    </sentence>
    <sentence type = "music description">
        <clause imm = "This tune by">parts/this_tune_by.wav.</clause>
        <clause type = "artist" permission = "word"> </clause>
        <clause imm = "was released on">parts/ was_released_on.wav. </clause>
        <clause type = "expresstion of year" permission = "word"> </clause>
        <clause type = "expression of month" permission = "word"> </clause>
        <clause type = "expression of day" permission = "word"> </clause>
        <clause imm = "sold up to"> parts/ sold_up_to.wav </clause>
        <clause type = "expression of sales" permission = "word" </clause>
        <clause type = " tune description" permission = "phrase"> </clause>
    </sentence>
    <sentence type = "epilogue"
        <clause type = "epilogue" permission = "phrase"> </clause>
    </sentence>
</narration template>
```

```
<?xml version ="1.0" encoding = "Shift - JIS"?>
<program>
        <title>new music in early 1970s  record sales best 30</title>
        <production date>2001/06/01</production date>
        <production hours>20:30:10</production hours>
        <contents information>
                <title>BGM1</title>
                <artist/>
                <to be connected to>program server</to be connected to>
                <URL>rtsp://ppp.qqq.rrr/temp/content/bgm01.mp3</URL>
        </contents information>
        <contents information>
                <title>program prologue</title>
                <artist/>
                <to be connected to>narration server</to be connected to>
                <URL>rtsp://aaa.bbb.ccc/temp/prologue.mp3</URL>
        </contents information>
        <contents information>
                <title>narration 1</title>
                <artist/>
                <to be connected to>narration server</to be connected to>
                <URL>rtsp://aaa.bbb.ccc/temp/narration01.mp3</URL>
        </contents information>
        <contents information>
                <title>CCDDD</title>
                <artist>△△××</artist>
                <to be connected to>contents server A</to be connected to>
                <URL>rtsp://xxx.yyy.zzz/dir1/title00013037.mp3</URL>
        </contents information>
                . . .
        <contents information>
                <title>narration 30</title>
                <artist/>
                <to be connected to>narration server</to be connected to>
                <URL>rtsp://aaa.bbb.ccc/temp/narration30.mp3</URL>
        </contents information>
        <contents information>
                <title>AAZZ</title>
                <artist>○○××</artist>
                <to be connected to>contents server A</to be connected to>
                <URL>rtsp://xxx.yyy.zzz/dir1/title00000101.mp3</URL>
        </contents information>
        <contents information>
                <title>program epilogue</title>
                <artist/>
                <to be connected to>narration server</to be connected to>
                <URL>rtsp://aaa.bbb.ccc/temp/epilogue.mp3</URL>
        </contents information>
</program>
```

108

– # PROGRAM DRAWING-UP APPARATUS, PROGRAM PROVIDING SYSTEM, METHODS TO BE USED WITH THE SAME, COMPUTER PROGRAMS TO BE USED WITH THE SAME AND RECORDING MEDIUM STORING SUCH COMPUTER PROGRAMS

BACKGROUND OF THE INVENTION

1. Field of the Invention

This invention relates to a program drawing-up apparatus, a program providing system, methods to be used with the same, computer programs to be used with the same and a recording medium storing such computer programs.

2. Description of Related Art

It has been a popular practice in recent years that audio/video contents to be used for multimedia of music and images are delivered broadly by way of The Internet or some other communications network. When compared with wired and wireless broadcastings such as television and radio broadcastings, information delivery systems by way of the Internet or the like are characterized in that information is delivered on an on-demand basis. A system operating on an on-demand basis delivers audio/video contents in response to a request issued from a user. For instance, as the user issues a request for delivery of certain contents to a server (contents delivery server) by way of a web service, the server immediately delivers the contents to the user in response to the request.

The contents delivery server stores a large volume of contents data to be delivered in storage mediums such as hard disks. When a request for delivery of certain contents is issued from the user to the contents delivery server, the latter reads the static contents from the storage mediums and delivers them in response to the request from the client apparatus that the user has.

One or more than one narrations may be added to the contents requested by the user as CMs. However, such narrations are static narrations that have already been prepared and stored.

With the above described prior art, the contents delivery server simply delivers static contents that have been prepared in advance in response to a request from the client apparatus. Therefore, it is accompanied by a problem that it cannot provide information that is particularly effective to a specific user.

SUMMARY OF THE INVENTION

In view of the above identified problem and other problems of the prior art, it is therefore the principal object of the present invention to provide a program drawing-up apparatus, a program providing system, methods to be used with the same, computer programs to be used with the same and a recording medium storing such computer programs that can be used to provide information that is effective to each specific user.

According to the invention, the above object is achieved by providing a program drawing-up apparatus comprising:

a delivery request acquisition section for acquiring a delivery request from a client apparatus;

a contents data retrieval section for retrieving contents data according to the delivery request;

an auxiliary data generation section for generating auxiliary data to be delivered in combination with the contents data; and a program drawing-up section for drawing up a program indicating the sequence of delivery of the contents data and the auxiliary data according to the delivery request.

According to the invention, there is also provided a program drawing-up method comprising:

a step of acquiring a delivery request from a client apparatus;

a step of retrieving contents data according to the delivery request;

a step of generating auxiliary data to be delivered in combination with the retrieved contents data; and a step of drawing up a program indicating the sequence of delivery of the contents data and the auxiliary data according to the delivery request.

In another aspect of the invention, there is provided a program drawing-up computer program for operating a computer as a program drawing-up apparatus according to the invention.

In still another aspect of the invention, there is provided a recording medium adapted to readably record a computer program for operating a computer as a program drawing-up apparatus according to the invention.

In still another aspect of the invention, there is provided a program providing system comprising:

a program drawing-up apparatus according to the invention;

a contents delivery apparatus storing contents data; and a client apparatus adapted to transmit a delivery request to the program drawing-up apparatus and receive contents data and auxiliary data.

In still another aspect of the invention, there is provided a program providing method comprising:

a step of acquiring a delivery request from a client apparatus;

a step of retrieving contents data according to the delivery request;

a step of generating auxiliary data to be delivered in combination with the retrieved contents data;

a step of drawing up a program indicating the sequence of delivery of the contents data and the auxiliary data according to the delivery request; and a step for the client apparatus to receive contents data delivered from the contents delivery apparatus and auxiliary data delivered from the program drawing-up apparatus.

In still another aspect of the invention, there is provided a program providing computer program for operating a computer as a program providing system according to the invention.

In a further aspect of the invention, there is provided a recording medium adapted to readably record a computer program for operating a computer as a program providing system according to the invention.

BRIEF DESCRIPTION OF THE DRAWINGS

FIG. 4 is a schematic illustration of a request log time/data table that can be used in the first embodiment, showing its configuration;

FIG. 5 is a schematic illustration of a request log contents table that can be used in the first embodiment, showing its configuration;

FIG. 8 is a schematic illustration of a word table that can be used in the first embodiment, showing its configuration;

FIG. 9 is a schematic illustration of a set phrase table that can be used in the first embodiment, showing its configuration;

FIG. 10 is a schematic illustration of a template table that can be used in the first embodiment, showing its configuration;

FIG. 12 is a schematic illustration of a profile table that can be used in the first embodiment, showing its configuration;

FIG. 17 is a schematic illustration of an example of program request information that can be used in the first embodiment;

FIG. 18 is a schematic illustration of an example of retrieval request information that can be used in the first embodiment;

FIG. 19 is a schematic illustration of an example of results of retrieval information that can be used in the first embodiment;

FIG. 20 is a schematic illustration of an example of narration request information that can be used in the first embodiment;

FIG. 21 is a schematic illustration of another example of narration request information that can be used in the first embodiment;

FIG. 22 is a schematic illustration of an example of reception/response information that can be used in the first embodiment;

FIG. 23 is a schematic illustration of an example of narration template that can be used in the first embodiment;

FIG. 24 is a schematic illustration of a program that can be provided by the first embodiment;

DETAILED DESCRIPTION OF THE PREFERRED EMBODIMENT(S)

The present invention will be described with reference to the accompanying drawings that illustrate preferred embodiments of the invention.

First Embodiment

[Overall Configuration of Program Providing System]

Figure 1:
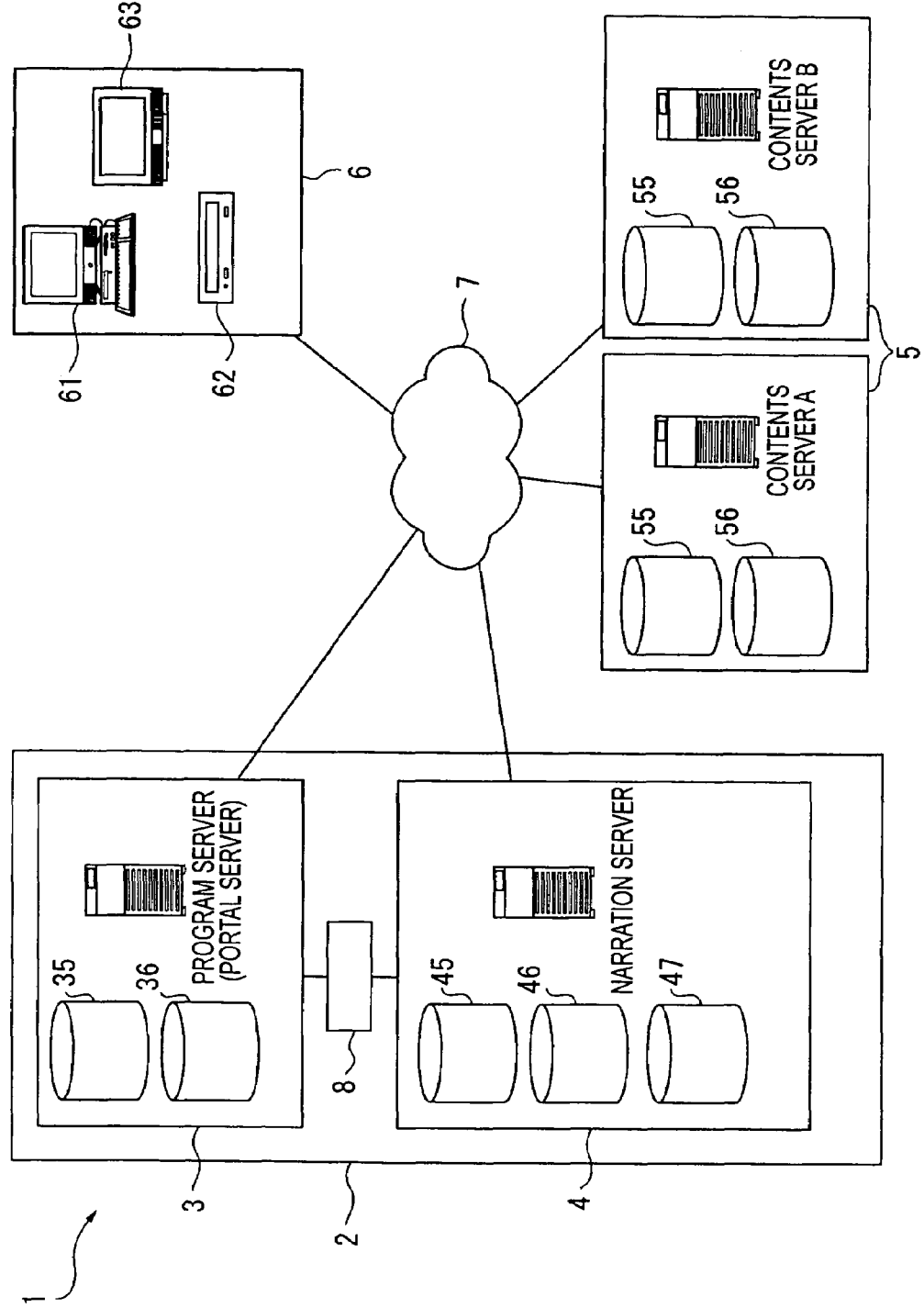
FIG. 1 is a schematic block diagram of the first embodiment of a program providing system according to the invention.

FIG. 1 is a schematic illustration of this embodiment of a program providing system 1, showing its overall configuration.

The program providing system 1 operates as a contents delivery system and comprises an on-demand program drawing-up apparatus 2, a contents delivery apparatus 5 and a client apparatus 6.

The on-demand program drawing-up apparatus 2 includes a program control device 3 and a narration synthesizer device 4 that is an auxiliary data generation section.

Each of the program control device 3, the narration synthesizer device 4 and the contents delivery apparatus 5 is formed by using an ordinary server device comprising ordinary hardware resources of a computer that typically include a processing unit (CPU, central processing unit), a main memory unit, one or more than one external memory units (storage mediums such as hard disks), one or more than one input units such as a keyboard and/or a mouse, one or more than one output units such as a display and/or a printer and communication units such as a modem and a router. Therefore, in the following description and the accompanying drawings, the program control device 3, the narration synthesizer device 4 and the contents delivery apparatus 5 may also be referred to respectively as program server (portal server), narration server and contents server.

Each of the specific section for performing various processing operations as will be discussed hereinafter is realized as a corresponding computer program that is installed in a related server device cooperates with any of the above listed hardware resources. Therefore, each of the above listed apparatus and devices have specific section that are different from those of any other apparatus and devices.

On the other hand, the client apparatus 6 is utilized by a user to transmit a request to a contents supply source (contents delivery apparatus 5) and receive the contents. Each of the client apparatus 6 may be a PC (personal computer) 61 having hardware resources similar to those of each of the above described server devices, an STB (set top box) 62 adapted to be connected to a TV set and receive various services or a TV set 63 having the functional features of an STB and also a feature of connecting itself to the Internet.

However, the client apparatus 6 is not limited to those listed above. In other words, any similar apparatus may be used as long as they have functional features that allow them to communicate with the program drawing-up apparatus 2 and the contents delivery apparatus 5 in order to transmit delivery request information and receive contents and related data. For instance, a specialized device such as a mobile phone set having various functional features for radio and wired communications, a PDA (personal digital assistant), an audio device, a navigation device for car and the like or a general purpose device such as a PC may also be utilized as a client apparatus 6.

An Internet 7, which is a WAN (wide area network), including dedicated lines and public telephone lines is utilized for communications among the program control device 3, the narration synthesizer device 4, the contents delivery apparatus 5 and the client apparatus 6 in this embodiment. Therefore, the program control device 3, the narration synthesizer device 4, the contents delivery apparatus 5 and the client apparatus 6 comprise a communication equipment 9A that allows them to be connected to the Internet 7.

In this embodiment, the program control device 3 and the narration synthesizer device 4 are adapted to communicate with the rest of the system also by way of a LAN (local area network) 8. In other words, the devices 3 and 4 comprise communication equipment 9B that allows them to be connected to the LAN 8 for communications.

If one of the contents delivery apparatus 5 is located in the premises where the devices 3 and 4 are installed, the devices 3 and 4 may be adapted to communicate with the contents delivery apparatus 5 by way of the LAN 8. If the program control device 3 and the narration synthesizer device 4 are located remotely from each other, they may be adapted to communicate with each other by way of the Internet 7. If the program control device 3, the narration synthesizer device 4, the contents delivery apparatus 5 and the client apparatus 6 are all located within a same premises (e.g., of a home, a school or a company), all the devices 3 through 6 may be adapted to communicate with each other by way of a LAN 8.

[Configuration of Program Control Device]

Figure 2:
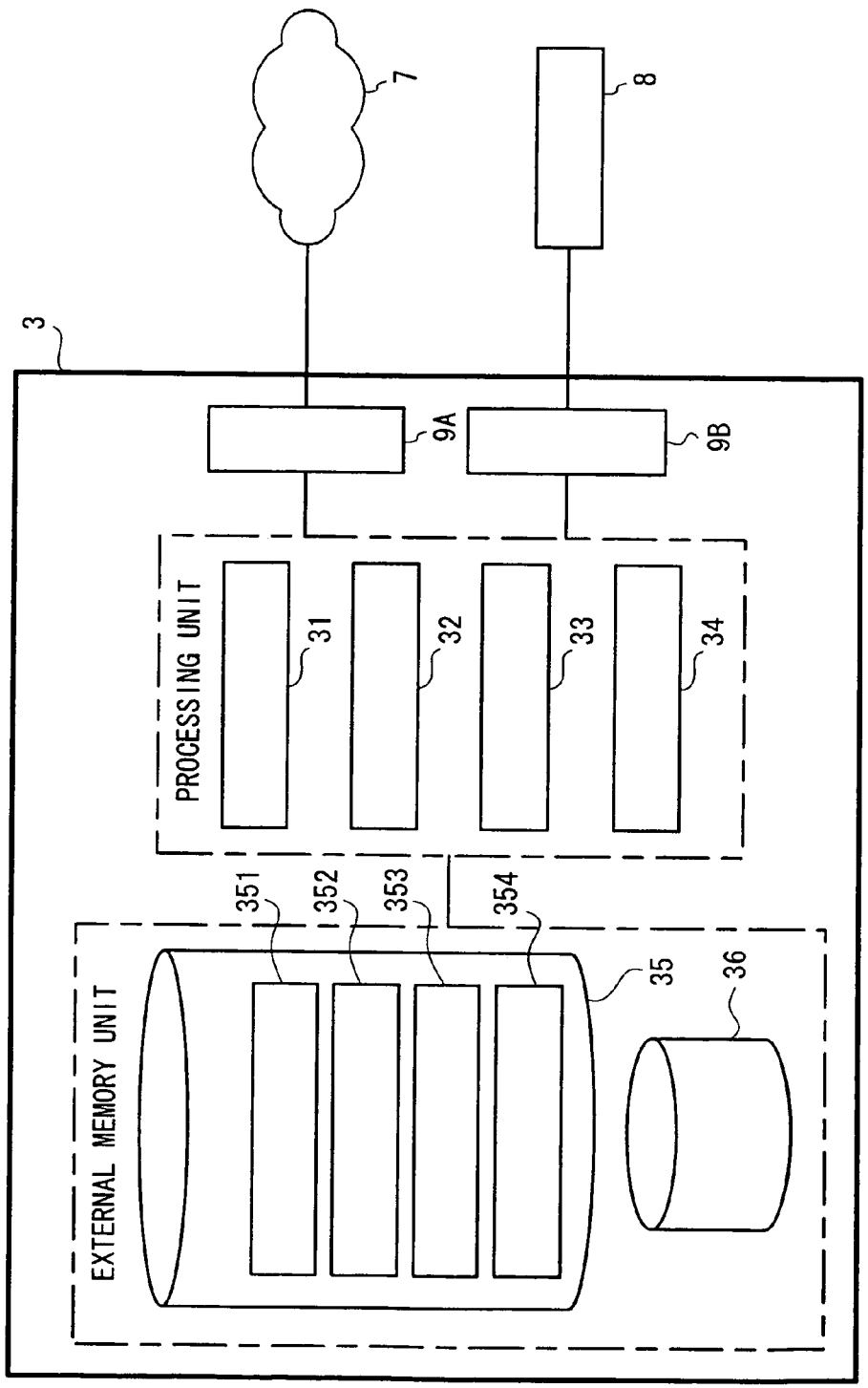
FIG. 2 is a schematic block diagram of a program control device of the first embodiment, illustrating its configuration.

The program control device 3 is one of the components of the program drawing-up apparatus 2 for making the latter operate properly. As shown in FIG. 2, it includes a delivery request acquisition section 31, a contents data retrieval section 32, a program drawing-up section 33, a program transmission section 34, a client control DB (data base) 35 and a BGM DB (data base) 36.

Each of the section 31 through 34 is realized as a corresponding computer program that is installed in the CPU cooperates with any of the hardware resources of the program control device 3 including the processing unit (CPU) and the main memory.

On the other hand, the client control DB 35 has data base files stored on one or more than one hard disk devices that are external storage devices (storage mediums). Data are written to and read from the client control DB 35 according to a command issued from any of the section 31 through 34 by way of a dedicated data base control system.

The client control DB 35 has a number of tables including a subscribers profile table 351, a request log time/date table 352, a request log contents table 353 and a request statistics table 354.

Figure 3:
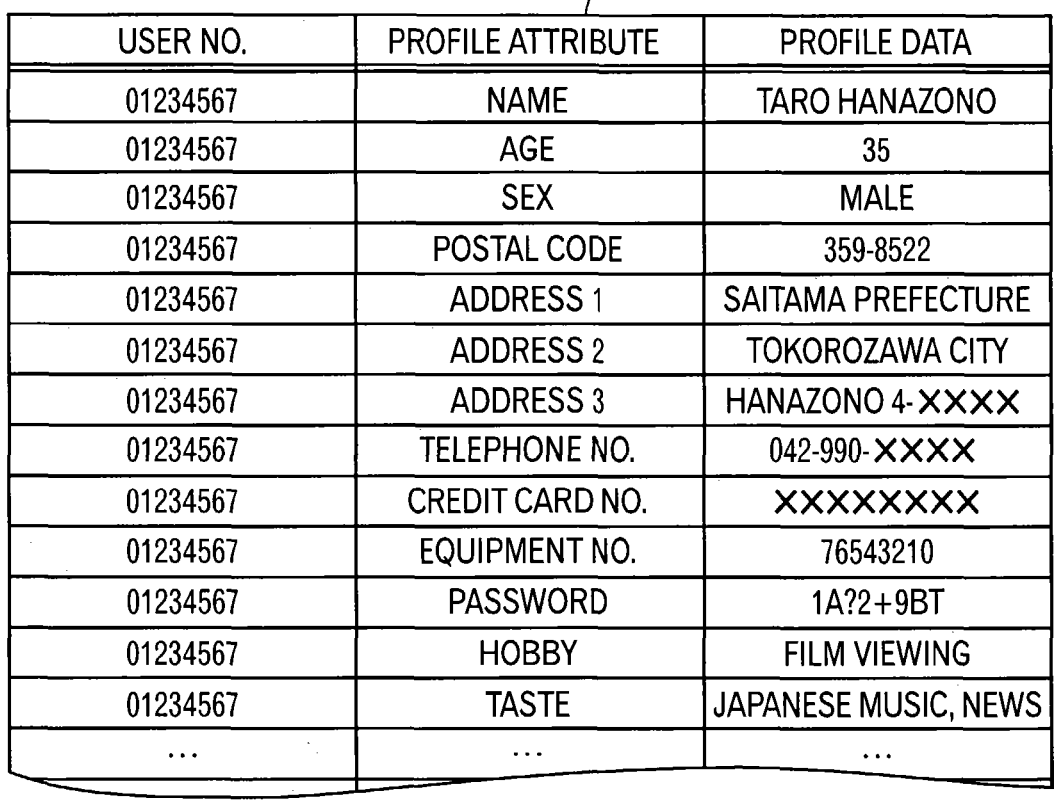
FIG. 3 is a schematic illustration of a profile table that can be used in the first embodiment, showing its configuration.

The profile table 351 contains various attributes (profile information) of each of the clients that are stored so as to correspond to the ID number of the client (user number), which can unequivocally identify the client. More specifically, the profile table 351 has a user number field, a profile attribute field and a profile data field for each user as shown in FIG. 3. The user number field contains the ID number that can identify the user. The profile attribute field contains user profile items (name, age, . . . , hobbies, tastes, etc.) and the profile data field contains data that correspond to the attribute items. Note that the attribute data of the user may include the equipment number for identifying the user and his or her terminal device that is required to provide a contents service to the user, a password and information on the hobbies and the tastes of the user that can be utilized to improve the customer service and develop commercial activities in addition to information that is indispensable for the purpose of client control such as the name and address of the client.

The request log tables 352, 353 are data tables showing the logs (history information) of the requests for programs (requests for delivering programs) that have been made to the program control device 3 from the clients (users). In this embodiment, as shown in FIG. 2, two log tables including a request log time/date table 352 showing the times and dates of the requests that have been made by the respective users, to which serial reception numbers are allocated, and a request log contents table 353 showing the contents of the requests are provided and held under control. The two tables 352, 353 may be combined to a single request log table.

As shown in FIG. 4, the request log time/date table 352 has fields for request numbers, user numbers, dates and times. The request number field is used to store the request numbers that are serial numbers allocated when the delivery request acquisition section 31 has acquired information on the delivery requests. Each delivery request number accompanies the user number who made the corresponding delivery request and the time and date when the delivery request was received.

On the other hand, the request log contents table 353 has fields for request numbers, request attributes and request data as shown in FIG. 5.

The request statistics table 354 is used to collect statistics on the requests made by each client on the basis of the data stored in the request log tables 352, 353. Thus, it is possible to acquire information on the hobbies of the client from the characteristic aspects of the statistic data collected in the request statistics table 354 and such information is fed back to the profile table 351 as attribute data of the client.

Figure 6:
FIG. 6 is a schematic illustration of a request statistics table that can be used in the first embodiment, showing its configuration.

The request statistics table 354 has an item field for storing data on the requests and a number of times field for storing the number of times by which each user has made the same request in addition to a field for user numbers as shown in FIG. 6.

It may be so arranged that the request statistics table 354 is updated when an administrator of the program control device 3 issues a command for collecting statistics by utilizing the request log time/date table 352 and the request log contents table 353 or each time when the delivery request acquisition section 31 receives information on a delivery request made by a user.

The delivery request acquisition section 31 of the program control device 3 acquires (receives) information on each delivery request transmitted from a client apparatus 6 by way of the Internet 7 and transmits the received information on the delivery request to the contents data retrieval section 32 so as to retrieve data from and write data in the client control data base 35 on the basis of the acquired information.

More specifically, the delivery request acquisition section 31 has a functional feature of presenting a form for inputting the user number and the password to the client apparatus which accesses by means of the WEB server feature incorporated in the program control device 3 or a form for inputting profile information (user information) required for the registration to a subscription applicant. Additionally, the delivery request acquisition section 31 also has a functional feature of browsing the profile table 351, using the user number and the password contained in the information on the delivery request acquired from the filled-in input form, and verifying that the person requesting the delivery service is a registered subscriber or not, that of writing certain data conforming to a predetermined format in the request log time/date table 352 and the request log contents table 353 on the basis of the information on the delivery request of the verified user and that of recording the profile information of the new subscriber/user in the profile table 351.

The contents data retrieval section 32 has a functional feature of preparing retrieval information, using the data necessary for retrieval from the information on the delivery request acquired by the delivery request acquisition section 31, and transmitting the prepared retrieval information to appropriate one of the contents delivery apparatus 5 and that of acquiring information on the results of retrieval from the contents delivery apparatus 5 and forwarding it to the program drawing-up section 33. Whenever necessary, the delivery request acquisition section 31 reads the profile information (user information) of the user from the profile table 351 and adds it to the retrieval information.

The data on the results of retrieval from the contents delivery apparatus 5 include information on the location of the contents data where the retrieved contents data are stored and information on the contents profile relating to the contents of the retrieved contents data.

The program drawing-up section 33 has a functional feature of transmitting the user's profile information read out from the client control data base 35 and the information on the results of retrieval (information on the contents profile) to the narration synthesizer device 4 and issuing a command for generating an auxiliary data, that of receiving reception/response information transmitted from the narration synthesizer device 4 and that of preparing a program (program table, schedule table, proceeding table) from the information on the results of retrieval and the reception/response information.

A command for generating auxiliary data is issued for each narration specified by the narration pattern that is selected on the basis of the delivery request information. In other words, when a plurality of auxiliary data (narration data) need to be prepared, a command for generating an auxiliary data is issued for each narration data to be generated and the narration synthesizer device 4 transmits reception/response information for each narration data.

The reception/response information includes the estimated processing time necessary for the operation of synthesizing a narration, the duration that is equal to the time necessary for replaying the narration and information on the location of the auxiliary data indicating the location where the narration data is stored.

The program drawn up by the program drawing-up section 33 contains the contents data and the auxiliary data to be delivered that are arranged according to the order of delivery of the data so that contents data and the auxiliary data are delivered in a predetermined order by referring to the program.

The program transmission section 34 transmits the program drawn up by the program drawing-up section 33 to the client apparatus 6 that has transmitted the corresponding delivery request.

The BGM data base 36 stores various BGM data (music data). The BGM data may typically be used when the operation of preparing a narration data takes time and hence the contents data and the auxiliary data cannot be transmitted quickly. Then, BGM may be transmitted to the client apparatus 6 until the data become ready for transmission.

[Configuration of Narration Synthesizer Device]

The narration synthesizer device 4 cooperates with the program control device 3 so as to make the program drawing-up apparatus 2 operate properly. Upon receiving a narration synthesizing request from the program drawing-up section 33, it synthetically prepares a narration data that meets the request and stores the synthetically prepared narration data in a storage medium such as a hard disk that is controlled by itself or by some other device in order to respond to the narration delivery request from the client apparatus 6 or the like. In this embodiment, the narration synthesizer device 4 also has a functional feature of estimating the time period necessary for synthetically composing a narration and the time necessary for replaying the composed narration on the basis of the request for synthesizing a narration received from the program drawing-up section 33 and transmitting the estimated time periods to the program drawing-up section 33 as reception/response information.

Any appropriate narration data synthesizing technique may be used for the narration synthesizer device 4. For example, the text of a narration may be prepared as text data and the narration may be synthetically composed by means of a voice synthesizer in order to convert the data into voices. However, as of now, voice synthesis is a time consuming operation so that such an operation may put a large load on the entire system. Additionally, the request issued from the program control device 3 is normally a string of words describing the attributes of each contents data and those describing the user profile information and keywords. The operation of composing a narration that can satisfy the program control device 3 and the user from such fragmental information may also put a large load on the narration synthesizer device 4.

Therefore, the narration synthesizer device 4 of this embodiment is configured in a manner as will be described below so as to alleviate the load that may put on the system.

Figure 7:
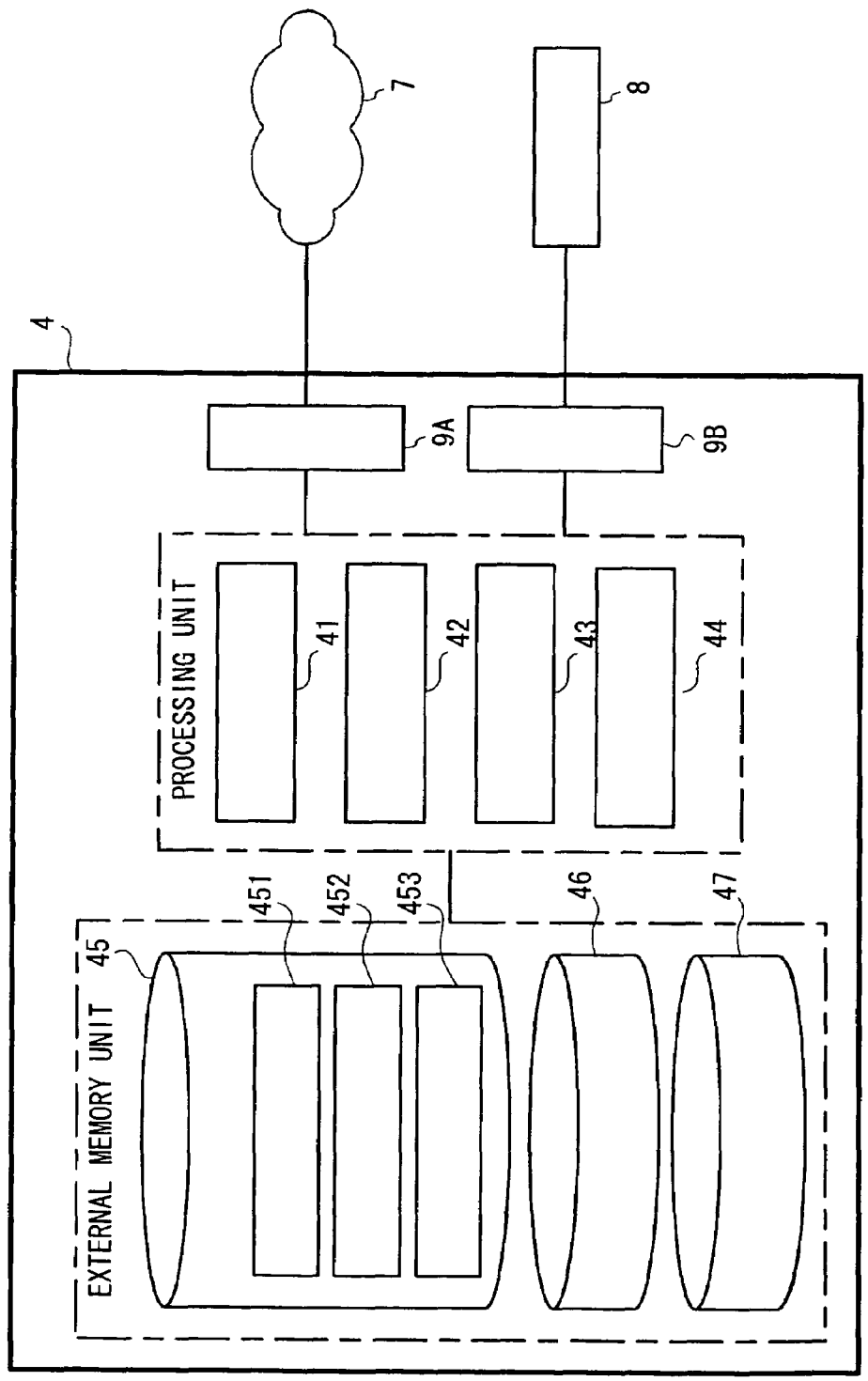
FIG. 7 is a schematic block diagram of the narration synthesizer device of the first embodiment, illustrating its configuration.

Referring to FIG. 7, the narration synthesizer device 4 is so formed as to include a narration synthesizing request acquisition section 41, a narration control section 42, a narration synthesizing section 43, a reception/response information transmission section 44, a narration DB (data base) 45, narration parts data 46 and narration materials data 47.

The narration DB 45 has a number of tables including a word table 451, a set phrase table 452 and a template table 453.

The word table 451 controls narrations (word data) of expressed words in terms of grammar, semantics and attributes of contents and so on in order to provide a scheme for drawing out an appropriate narration (word data) for the efforts of retrieving word data, using keywords, from each point of view. More specifically, the word table 451 includes a word number field, a profile attribute field and a profile data field as shown in FIG. 8. Various attribute data including the part of speech, the application, the classification, the content, the (spoken) time and the data storage location of each word that can be identified by a word number (e.g., "1973AD") are stored there.

Like the word table 451, the set phrase table 452 provides a scheme for drawing out an appropriate narration (set phrase data) for the efforts of retrieving set phrase data, using keywords, from each point of view. More specifically, the set phrase table 452 includes a phrase number field, a profile attribute field and a profile data field as shown in FIG. 9. Various attribute data including the application, the classification, the content, the (spoken) time and the data storage location of each phrase (e.g., "The first ranking tune is") that can be identified by a phrase number are stored there.

The template table 453 provides a scheme for drawing out an appropriate template for composing a narration that matches the objective by combining words and set phrases. More specifically, the template table 453 includes a template number field, a profile attribute field and a profile data field as shown in FIG. 10. Various attribute data including the application, the classification, the time and the data storage location of each template that can be identified by a template number are stored there. The time of each template file represents the time required for reproducing the words and the phrases arranged in the template in advance before arranging set phrases and words in it.

The narration parts data 46 include the word data, the set phrase data, the template data and other data that are controlled by the narration DB 45. The narration parts data 46 are hierarchized for each type of data and stored in predetermined folders on a hard disk by utilizing, if appropriate, sub folders.

The narration material data 47 include data to be used as narration materials for newly synthesizing narration parts. For example, they may include 50 Japanese phonetic sound data of "a, i, u, e, o, ka, . . . , n", syllabic sound data of "sat', kat', . . . " and other sound data that are effective for various speech patterns. Thus, when a phrase of "the thirtieth ranking tune" is newly required for a narration, the narration parts can be newly synthesized by appropriately combining some of the material data 47. The narration parts data that are newly synthesized are added to and controlled by the narration DB 45 so that they may be utilized sometime later.

[Configuration of Contents Delivery Apparatus]

Figure 11:
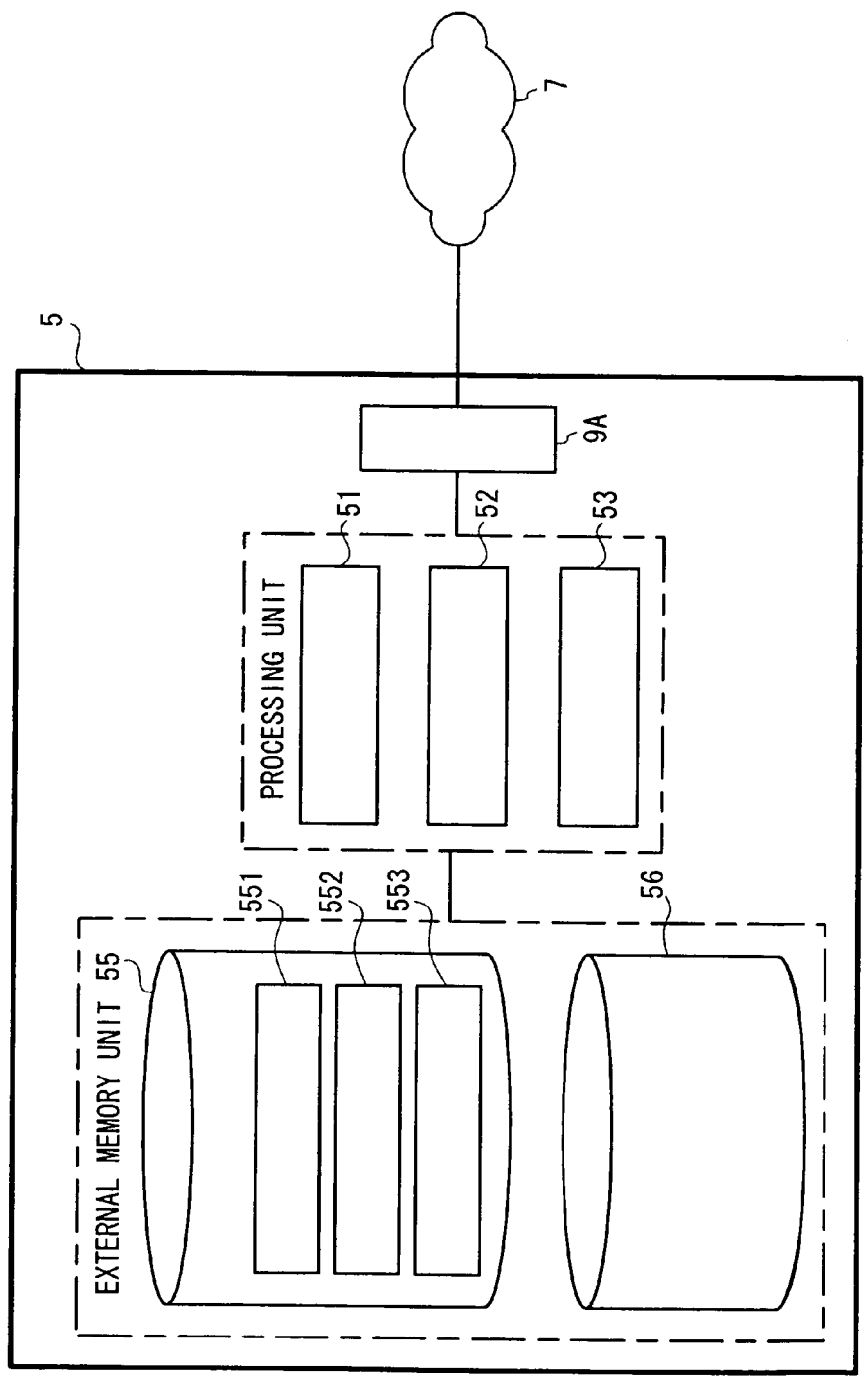
FIG. 11 is a schematic block diagram of the contents delivery apparatus of the first embodiment, illustrating its configuration.

The contents delivery apparatus 5 comprise respective contents servers that store a vast volume of contents data such as music data and video data on storage mediums and deliver contents in response to each request for contents transmitted from a client apparatus 6. More specifically, the contents delivery apparatus 5 includes a retrieval information reception section 51, a results of retrieval reporting section 52, a contents delivery section 53, a contents DB (data base) 55 and contents data 56 as shown in FIG. 11.

Each of the section 51 through 53 are means realized as a result of cooperation of some or all of the hardware resources such as the processing unit (CPU) and the main memory of the contents delivery apparatus 5 and the programs installed in the CPU so as to be executed appropriately. The contents DB 55 includes data base files stored in a storage medium such as a hard disk and a control system for controlling the data base files. The contents data 56 include music and video contents data and the storage locations and the attributes of the data are controlled by the contents DB 55.

The contents DB 55 has a number of tables including a profile table 551, a service log table 552 and a product table 553.

The profile table 551 stores contents numbers by means of which the contents delivery apparatus 5 can unequivocally identify the sets of contents and a number of pieces of attribute information specific to each contents number. More specifically, the profile table 551 includes fields for contents numbers, profile attributes and profile data as shown in FIG. 12 and each contents number is accompanied by the type of corresponding profile attributes and also by corresponding data.

Attribute data that can be used for the profile table 551 may include information relating to the attributes of each set of contents such as the title, the type, the genre and the duration of the contents, copy right information such as information on the copy right of the performing artist(s), that of the lyrics and that of the melodies in the contents, distribution related information including the date when the contents were released for sale and the number of packages that are sold so far as well as additional information selected in response to the request of the service provider such as the CM contents that are provided simultaneously. Attribute data may also include information on the locations of contents data which shows storage locations of the contents data. In this embodiment, the information on the locations of contents data is described in terms of URLs (uniform resource locators).

Figure 13:
FIG. 13 is a schematic illustration of a service log table that can be used in the first embodiment, showing its configuration.

The service log table 552 is a data table showing when packages of each set of contents possessed by the contents delivery apparatus 5 were delivered as products in the past. As shown in FIG. 13, it has fields for product numbers, each being allocated to a delivered package of contents at the time of delivery, dates of delivery of packages and times of delivery.

Figure 14:
FIG. 14 is a schematic illustration of a product table that can be used in the first embodiment, showing its configuration.

As shown in FIG. 14, the product table 553 is a table showing product members, each being allocated to a delivered package of contents at the time of delivery, along with corresponding numbers of delivered sets of contents, destination numbers of destinations to which packages are delivered and the client numbers to whom packages are delivered.

Destination numbers are used to identify program servers (portal servers) that are program control devices 3. If there are a number of program control devices (portal servers) 3, each contents delivery apparatus 5 provides a set of contents to the program control device 3 that controls the client (end user or the like). Thus, for the program server to identify the client to whom the contents are to be provided, it needs to know both the program control device 3 that controls the client (subscriber) and the client number. Therefore, the contents delivery apparatus 5 stores both destination numbers (for identifying the program control devices 3) and client numbers (of the clients controlled by the program control devices 3) as delivery log.

[Operation of Program Providing System]

Figure 15:
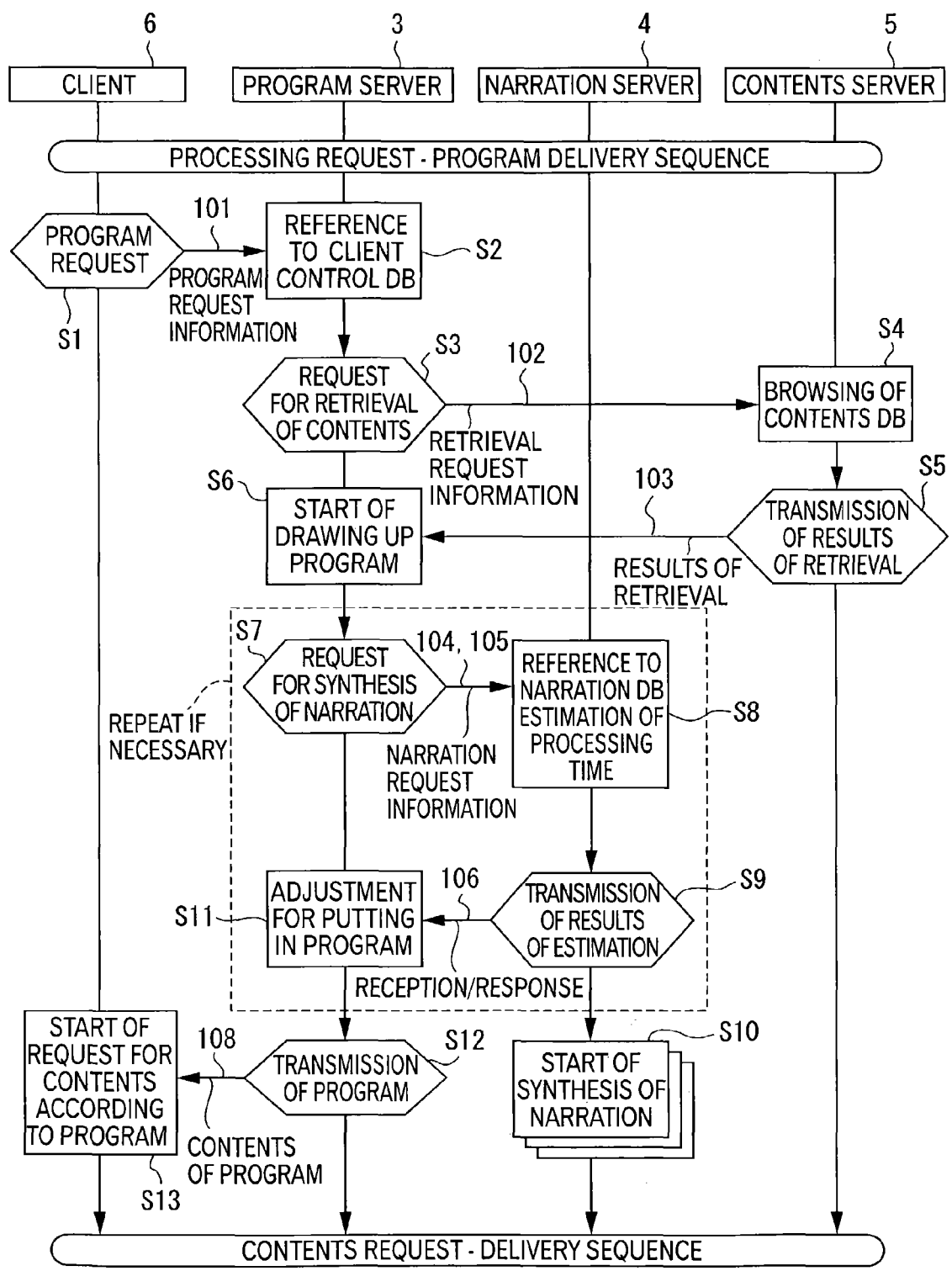
FIG. 15 is a flowchart of processing operation from a request for a program to delivery of the program of the first embodiment.
Figure 16:
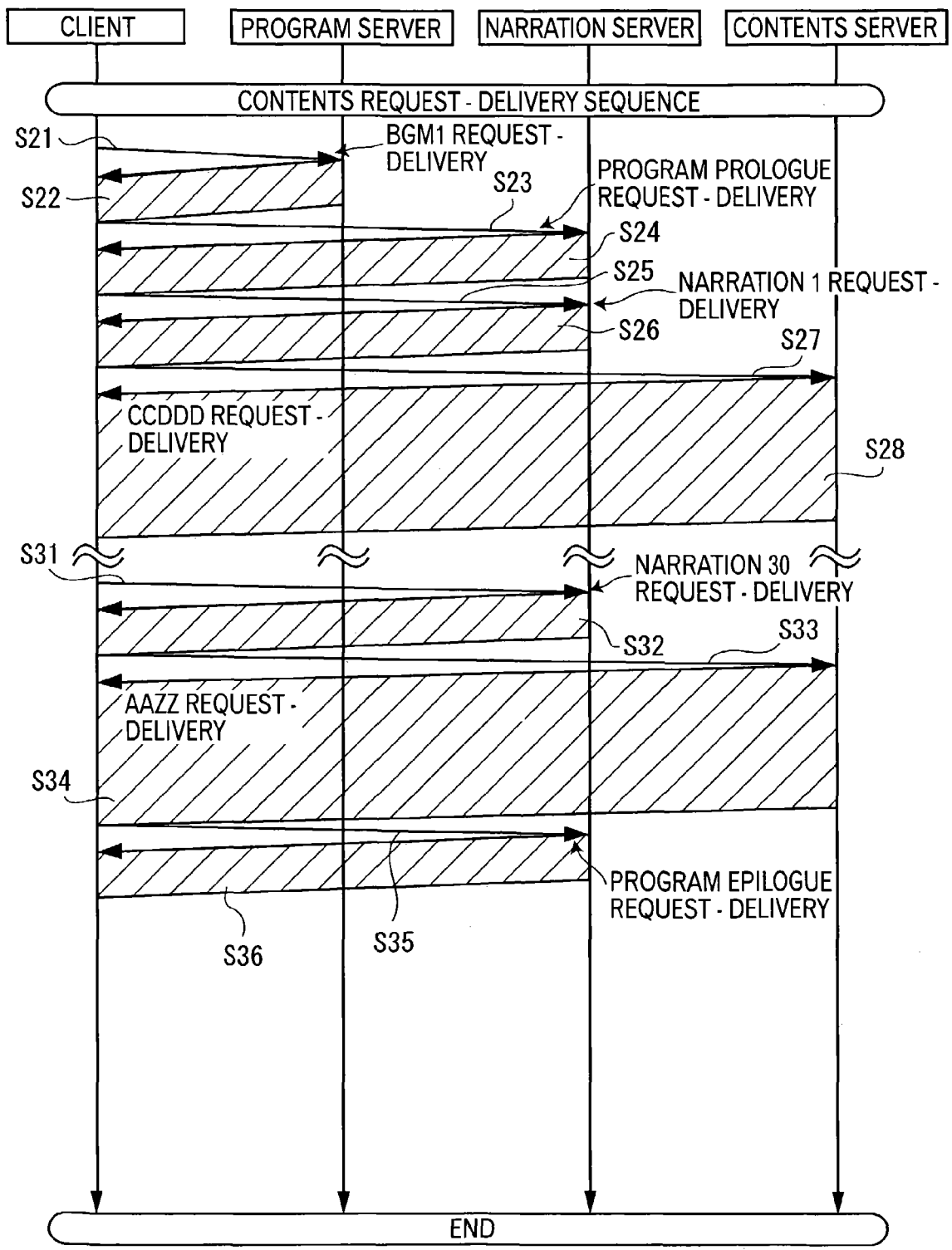
FIG. 16 is a flowchart of processing operation from a request for contents to delivery of the contents of the first embodiment.

Now, the operation of this embodiment of program providing system 1 at the time of delivering contents will be described by referring to FIGS. 15 through 24. FIG. 15 is a flowchart illustrating the sequence of processing steps from a request for a program issued from a client apparatus 6 to the delivery of the requested program. FIG. 16 is a flowchart illustrating the sequence of the processing steps from a request for a set of contents to the delivery of the requested contents which is executed immediately after the steps of FIG. 15.

The user who wants a set of contents to be delivered to him or her will access the program control device 3, typically utilizing the Web browser software of the PC 61 of the client apparatus 6, for authentication. The authentication is carried out as the program control device 3 displays an image that prompts the user to input the user number and the password and sees if the input data agree with the corresponding data stored in the client control DB 35 or not. If the person who accesses the program control device 3 is a person who wants to newly subscribe, the program control device 3 displays an image that prompts the person to input his or her name and address and other information necessary for subscription. Then, the program control device 3 issues a user number and a password to the applicant to complete the subscription procedure. Since the processing operation for authentication and the one for a new subscription are same as conventional ones, they will not be described any further and are omitted from FIG. 15.

After the completion of the authentication or subscription process, the user operates the client apparatus 6 to transmit information on a request for a program to be delivered to the program control device 3 (Step S1).

FIG. 17 illustrates as example information on a request for a program to be delivered that can be transmitted to the program control device 3. Note that the program request information 101 is described in a tag format conforming to the XML (extensible markup language) that is normally used for transmitting and receiving data by way of a network.

The program request information 101 may contain the equipment number that shows the environment of the client as well as data for time, date and location. The equipment number is important for the program control device 3 to know the format of contents that the client apparatus 6 of the user can use to replay the contents. The program control device 3 may find out the capacity of the client apparatus 6 (what format of contents it can use to replay the contents) from the equipment number when itself or some other server device is provided with a terminal DB (data base) that can be referred to for the specifications of the client apparatus (terminal) 6 on the basis of the equipment number.

The program request information 101 contains data showing the request in detail as principal information. FIG. 17 illustrates program request information 101 for requesting a set of music contents to be delivered that specifies the genre, the age, the number of tunes and the number of sold records of each tune which is used to determine the order in which the tunes are arranged (delivered).

However, the example of FIG. 17 does not limit the scope of program request information 101 that can be used for the purpose of the present invention. Program request information 101 may additionally or alternatively contain the names of countries, the performing artists and/or a specific keyword. Additionally, it is not necessary for the program request information to contain a specific title. For instance, it may contain the names of the performing artists or simply describe "a female vocalist who plays relaxing music".

Upon receiving the program request information 101 transmitted from the client apparatus 6, the delivery request acquisition section 31 of the program control device (program server) 3 transfers the information 101 to the contents data retrieval section 32.

The contents data retrieval section 32 browses the client control DB 35, utilizing the equipment number of the program request information 101 and the user number acquired at the time of user authentication, and refers to the attribute information of the user (Step S2).

Then, the contents data retrieval section 32 issues a request for retrieving contents to the contents delivery apparatus 5 that contains the program request information 101, to which, if necessary, attribute information of the user is added (Step S3).

FIG. 18 shows an example of retrieval request information that may be transmitted to the contents delivery apparatus 5. Like the program request information 101, the retrieval request information 102 is described in a tag format conforming to the XML and contains requirements to be met for the retrieval. In the illustrated example, a country-related requirement from the attribute information of the user is added to the requirements for genre, time and sort that are contained in the program request information 101.

As the contents delivery apparatus 5 receive the retrieval request information 102 transmitted form the program control device 3, the retrieval information reception section 51 of each of them browses the profile table 551 of the contents DB 55, referring to the query (requirements to be met for the retrieval) contained in the retrieval request information 102 (Step S4). In the case of the example of retrieval request information 102, the contents information that has the country attribute is "Japan" and the genre attribute is "new music", whereas the release date attribute is "early 1970s", or "Jan. 1, 1970 through Dec. 31, 1974", in the profile table 551 is retrieved.

Then, the results of retrieval reporting section 52 of the contents delivery apparatus 5 transmits a report on the results of the retrieval operation to the program control device 3 (Step S5). FIG. 19 shows an example of results of the retrieval operation that may be transmitted at this time. The results of retrieval information 103 are described in a tag format conforming to the XML. In the illustrated example, it is possible to find out the number of hits (sets of contents) extracted in response to the retrieval request from the hit attribute of the  tag. The contents information of each set of contents that is hit is described in the corresponding <contents information> tag. The contents information includes the contents attribute, the copy right attribute and the distribution attribute of the set of contents. More specifically, it includes the control number of the set of contents and the URLs indicating the locations where the music data of the contents are stored (information on the locations of contents data) as well as other attribute data of the contents including the title, the names of the performing artists, the duration, the release date, the number of sold copies, the abstract and the like.

While only a single contents delivery apparatus 5 is shown in FIG. 15, if there are a number of contents delivery apparatus 5 are involved, the retrieval request information 102 is transmitted to each of the contents delivery apparatus 5, which by turn transmits the results of retrieval information 103 of its own to the program control device 3.

Upon receiving the results of retrieval information 103 from the contents delivery apparatus 5, the program control device 3 starts drawing up a program, using the program drawing-up section 33 (Step S6).

Firstly, the program drawing-up section 33 collects all the results of retrieval information 103 transmitted from the related contents delivery apparatus 5. Then, it selects a set of contents that optimally satisfies the requirements imposed by the user and matches the request information and determines the sequence of arranging the contents in the program. From the viewpoint of the requirements imposed by the user, if the contents include those produced in a format that cannot be replayed by the user's client apparatus 6, such contents will be excluded. On the other hand, from the viewpoint of the request information, the number of tunes contained in the program may be reduced and/or the tunes may be rearranged by means of the specified sort key (the number of sold copies).

Thereafter, the program drawing-up section 33 asks the narration synthesizer device 4 to synthesize a narration (to generate auxiliary data) that is suited for each of the contents and the overall program on the basis of the information on the requirements imposed by the user and the information on the selected contents (Step S7). FIGS. 20 and 21 illustrate examples of narration request information that may be transmitted at this time.

FIG. 20 illustrates an example of narration request information 104 for requesting synthetic composition of a narration for the program prologue that will be delivered at the top of a program. FIG. 21 illustrates an example of narration request information 105 for requesting synthetic composition of a narration for the contents.

While the program drawing-up section 33 decides the request to be made for synthetic composition of one or more than one narrations by referring to the results of retrieval 103 and the program request information 101, it is normally so arranged that the program drawing-up section 33 requests synthetic composition of a narration for the program prologue, one for the contents and one for the program epilogue.

The pieces of narration request information 104, 105 are described in a tag format conforming to the XML. In each of the examples, the <purpose> tag shows the purpose of narration. Information that can be used as material for the narration that serves for the indicated purpose is provided as a series of <program information> tags and <contents information> tags. Information that can be used to assist the composition of a narration is provided in the form of type attributes shown in the various <program information> tags and <contents information> tags.

Additionally, the narration request information 104 includes various news-related information as additional information as well as client information and program information. While the additional information is not indispensable, it contains keywords for news items that took place in the age slot of the program and are retrieved from other data bases and added to the narration request information 104 by the program control device 3 in order to make the program more satisfactory to the taste of the user if the user's profile table 351 says that the user has a taste for news. If the narration synthesizer device 4 has narration data that can be used for the news items (materials) in the narration DB 45, those data may be taken into the narration.

As the narration control section 42 receives narration request information 104 by way of the narration synthesizing request acquisition section 41, it operates the narration DB 45 according to the narration request information 104 in the delivery request information from the client to select the templates, the set phrases and the words that are to be used for synthesizing narrations and, at the same time, judges if one or more than one new narrations need to be synthesized or not. Then, it assesses the workload necessary for synthesizing the requested narrations on the basis of the attributes of the selected narration parts and the volume of the new narrations that need to be synthesized. Additionally, it estimates the time period that needs to be spent for the purpose of synthesizing the requested narrations, taking the narration synthesizing job for which a synthesizing command is issued to the narration synthesizing section 43 and which is already in the queue into consideration (Step S8).

Thereafter, the reception/response information transmission section 44 transmits the outcome of the estimation to the program control device 3 as reception/response information 106 (Step S9).

As shown in FIG. 22, the reception/response information 106 is described in a tag format conforming to the XML and contains the reception number, the necessary time period, the duration, the server name and the URL.

The reception number is a unique number given by the narration control section 42 so as to be used when a processing operation for a transaction needs to be conducted for the purpose of controlling the service log or for some other reason that has arisen after the reception in order to specify the service.

The necessary time period refers to the time period that needs to be spent for composing the narrations. As pointed out above, the narration synthesizer device 4 estimates the time period necessary for synthetically composing a narration on the basis of the duration of each word or set phrase as indicated by the narration template, the presence or absence of words and/or set phrases that need to be newly synthesized, the operation efficiency of the CPU when a number of requests for synthesis operations have been received and other factors. The reference data to be referred to for the estimating operation are provided in advance in the narration synthesizer device 4 as data on empirical values. Additionally, these data will be updated appropriately on the basis of the actual values obtained in actual operations.

The duration is equal to the time period that is to be spent for replaying the narration. The narration synthesizer device 4 computationally determines the duration by seeing the template selected at the time of reception and adding the duration of the words and the set phrases that are used in the templates. The duration is used by the program drawing-up section 33 as data for drawing-up the program.

The server name is the host name of the server that provides (stores) the narration data. The URL is information including auxiliary data locations where the narration data are stored and the transmission protocol for transmitting the data. It is used to access the narration data. In the above example, it is so arranged that the narration data synthesized in the MP3 (MPEG Audio Layer-3) format is requested in an RTSP (real time streaming protocol) scheme and hence music data are delivered in a streaming format.

The narration synthesizer device 4 transmits the reception/response information 106 back to the program control device 3 and, at the same time, carries out the operation of synthesizing narrations by way of the narration synthesizing section 43, using the narration parts (template, set phrases and words) selected by operating the narration DB 45 as described above (Step S10).

As a process of synthesizing a narration, selected set phrases and words may be placed at respective right positions in the selected template to link them together and narration data may be connected for the synthesis on the basis of the information on the linking placements. FIG. 23 illustrates an example of format that can be used for a narration synthesizing template with the above process.

FIG. 23 illustrates the configuration of such a narration synthesizing template 107. In FIG. 23, the descriptions are made in a tag format conforming to the XML for the purpose of easy understanding.

A narration contains a number of sentences, each of which contains clauses. A word or phrase having a particular attribute may be arranged in a clause. The attribute is specified in a template 107 so that a narration can be composed for a specific purpose by way of the narration synthesizing section 43, using a template 107. In addition to clauses in which words and/or phrases can be arranged appropriately, there may be clauses that can take only predetermined words (and phrases). The clauses for which words (and phrases) are specified directly by means of an imm attribute in the template 107 of FIG. 23 are such ones.

The narration completely composed by the narration synthesizing section 43 is then arranged at a predetermined location that can be accessed by the URL that is shown in the reception/response information 106 transmitted back to the program control device 3 from the narration synthesizer device 4.

As the program drawing-up section 33 receives the reception/response information 106, it refers to the duration of the narration, the information on the URL and other data, adds the information necessary for delivering the auxiliary data to the program being drawn up and makes necessary adjustment (Step S11). At this time, the program drawing-up section 33 refers to the time period necessary for synthetically composing the narration shown in the reception/response information 106 and, if it judges that the time period necessary for synthetically composing the narration is too long from the viewpoint of the time table for preparing the program, it may make temporal adjustment by inserting contents information for BGM and/or spot CMs before the narration.

The processing operations of steps S7 through S11 are repeated for a number of times necessary to meet the request for synthetically composing each narration. More specifically, after the processing operation of estimating the time period necessary for composing a narration for the program prologue and making adjustment for adding auxiliary data to the program on the basis of the narration request information 104 for the program prologue, a processing operation of estimating the time period for composing a narration for a program content and making adjustment for adding auxiliary data to the program on the basis of the narration request information 105 for the set of contents is repeated for a number of times equal to the number of contents. Then, finally, a similar processing operation is carried out on the basis of the narration request information for the program epilogue.

Thus, pieces of information such as those on the URLs for accessing the narrations may be added to the front end of each contents information of the program and then the entire operation of drawing up a program (program table, schedule table) is completed.

On the other hand, the narration synthesizer device 4 sequentially carries out the operations of synthetically composing the narrations specified as a result of the processing operations of steps S7 through S11 (Step S10).

As the program drawing-up operation of the program drawing-up section 33 is completed, the program transmission section 34 transmits the prepared program 108 to the client apparatus 6 (Step S12). FIG. 24 illustrates an example of description format of the program 108 that may be delivered to the client apparatus 6.

The program 108 is described in a tag format conforming to the XML. In the instance of FIG. 24, all the components of the program including main contents (contents data) and auxiliary data such as narrations, BGM and CMs are treated as equally qualified components, or contents, so that the pieces of information on all the components are provided as a series of <contents information> tags.

In the program 108, the narration of each content is added to the front end of the content on the basis of the contents information obtained from each of the contents delivery apparatus 5 and a prologue narration is arranged at the front end of the program whereas an epilogue narration is arranged at the rear end of the program. Since the operation of synthetically composing the first narration is not completed by the time of delivering the program 108, BGM is arranged at the front end of the program. Since this embodiment of program providing system 1 is an on-demand delivery system and hence contents are delivered immediately after receiving a request for delivering a program from a client apparatus 6, there may be occasions where narrations may not be synthetically composed in time. If such is the case, appropriate BGM is selected from the BGM DB 36 and delivered to the client apparatus 6 in order to minimize the time period in which the client apparatus 6 is held idle.

Upon receiving the program 108, the client apparatus 6 starts requesting the delivery of contents according to the program 108 (Step S13).

The sequence of request/delivery of contents will be described below by referring to FIG. 16. Assume that, in the instance of FIG. 16, a total of n pieces of contents information are contained in the program 108.

The client apparatus 6 accesses the program control device (program server) 3 by referring to the first piece of contents information in the program 108 and utilizing the URL specified in the information and requests delivery of BGM (Step S21). Then, the apparatus 6 receives the BGM 1 delivered from the program control device 3 (Step S22). While the delivery (reception) of the BGM 1 is shown as a strip in FIG. 16, it indicates that the BGM 1 is replayed and delivered on a part by part basis because it is delivered by a streaming method. Note that this description also applies to the delivery of each content that will be described below.

As the reception (replay) of the BGM 1 is completed, the client apparatus 6 accesses the narration synthesizer device (narration server) 4 according to the second piece of contents information in the program 108 and requests delivery of the program prologue (Step S23). Then, it receives the program prologue delivered from the narration synthesizer device 4 (Step S24).

When the reception (replay) of the program prologue is over, the client apparatus 6 accesses the narration synthesizer device 4 according to the third piece of contents information in the program 108 and requests delivery of the narration 1 (Step S25). Then, it receives the narration 1 delivered from the narration synthesizer device 4 (Step S26).

When the reception of the narration 1 is over, the client apparatus 6 accesses the contents delivery apparatus (contents server) 5 according to the fourth piece of contents information in the program 108 and requests delivery of the music data of the first content that is titled as "CCDDD" (Step S27). Then, it receives the music data delivered from the contents delivery apparatus 5 (Step S28).

Thus, the client apparatus 6 repeats the operation of requesting and receiving delivery of the narration (auxiliary data) of each content and music data (contents data) according to the program 108, although it will not be described nor illustrated any further.

Then, the client apparatus 6 accesses the narration synthesizer device 4 according to the n-2-th piece of contents information in the program 108 and requests delivery of the narration 30 (Step S31). Then, it receives the narration 30 delivered from the narration synthesizer device 30 (Step S32).

When the reception of the narration 30 is over, the client apparatus 6 accesses the contents delivery apparatus (contents server) 5 according to the n-1-th piece of contents information in the program 108 and requests delivery of the music data that is titled as "AAZZ" (Step S33). Then, it receives the music data delivered from the contents delivery apparatus 5 (Step S34).

When the reception of the music data (AAZZ) is over, the client apparatus 6 accesses the narration synthesizer device 4 according to the n-th piece of contents information in the program 108 and requests delivery of the program epilogue (Step S35). Then, it receives the program epilogue delivered from the narration synthesizer device 4 (Step S36).

Then, the delivery of all the contents information of the program 108 is completed and the sequence of request/delivery of contents is over.

When a request for a program (Step S1) is issued from another client apparatus 6, the above processing operations (Steps S1 through S36) are repeated to deliver the predetermined narrations (auxiliary data) and the contents data in a predetermined sequence so that the requested program is displayed and sounded at the client apparatus 6.

Thus, a program drawing-up method to be used with the above described embodiment of program providing system comprises at least a step where the delivery request acquisition section acquires delivery request information from a client apparatus, a step where the contents data retrieval section retrieves contents data according to the delivery request information, a step where the auxiliary data generation section generates auxiliary data to be combined with the retrieved contents data and delivered, a step where the program drawing-up section draws up a program showing the sequence of delivery of the contents data and the auxiliary data according to the delivery request information.

Similarly, a program providing method to be used with the above described embodiment of program providing system comprises at least a step where the delivery request acquisition section acquires delivery request information from a client apparatus, a step where the contents data retrieval section retrieves contents data according to the delivery request information, a step where the auxiliary data generation section generates auxiliary data to be combined with the retrieved contents data and delivered, a step where the program drawing-up section draws up a program showing the sequence of delivery of the contents data and the auxiliary data according to the delivery request information and a step where the client apparatus receives the contents data delivered from the contents delivery apparatus and the auxiliary data from the program drawing-up apparatus.

[Advantages of First Embodiment]

Since the program drawing-up apparatus 2 comprises a program control device 3 and a narration synthesizer device 4, it can deliver not only right contents in response to a request for delivering contents from a client apparatus 6 but also narration data relating to the contents by arranging them between contents. Thus, the contents delivery services can be made as effective and attractive as television and radio broadcastings (in terms of narration and program hosts). Additionally, since the contents delivered to a user match the tastes of the user, it is possible to draw up a program that meets the needs of the user and deliver useful and effective information (contents) to the user.

The narration synthesizer device 4 synthetically composes narrations according to the contents profile information obtained by browsing the profile data of the user and the contents delivery apparatus 5. Thus, the narration synthesizer device 4 can compose narrations (auxiliary data) that meet not only the requirements of the client but also the requirements of the contents providers who want to provide CMs (commercials) related to the contents as well. Therefore, the program drawing-up apparatus 2 can draw up a program that satisfies not only the needs of the client but also the business-related needs of the contents providers.

Then, it may be possible to establish a business model that can charge the users (subscribers) a fee when delivering audio and video contents data or alternatively a business model that does not charge the users any charge when delivering audio and video contents data like ordinary television and radio broadcastings by delivering contents as streaming data that cannot be stored in the client apparatus 6 and inserting CM narrations between contents in such a way that no copy right problem and the like may arise there and profits and other effects can be expected from the CMs.

Particularly, while broadcasting has a large number of unidentifiable receivers, the program drawing-up apparatus 2 of this embodiment is adapted to deliver a program to each unequivocally identifiable user on an on-demand basis so that it can deliver CMs and other auxiliary data that match the tastes and the hobbies of the user to achieve remarkably high commercial effects.

The program drawing-up apparatus 2 comprises a program control device 3 and a narration synthesizer device 4 that share its functional features. They perform their respective duties so that efficient processing operations may be realized even when a number of program delivery requests are issued simultaneously from many client apparatus 6.

Additionally, one or more than one contents delivery apparatus 5 are provided apart from the devices 3 and 4, the program control device 3 does not need to retrieve contents by itself. With such distributed processing, efficient processing operations may be realized in this aspect as well.

Still additionally, the program providing system 1 can be built by connecting the program drawing-up apparatus 2 and the contents delivery apparatus 5 separately to the Internet 7 or the like, separate persons may be held to be respectively in charge of the program drawing-up apparatus 2 and the contents delivery apparatus 5. With such an arrangement, the copy right owners of the contents may be held to be respectively in charge of the contents delivery apparatus 5. Then, a program providing system 1 that utilizes contents delivery apparatus 5, of which various persons are in charge, can be built at relatively low cost.

As the narration synthesizer device 4 receives a request for synthetically composing a narration from the program control device 3, it estimates the time period necessary for the operation of synthetically composing the narration and transmits the outcome of the estimation as reception/response information 106 to the program control device 3. Thus, the program drawing-up section 33 can know the time period that needs to be spent until the delivery of narration data so that it can draw up a program in a highly flexible manner.

For example, if it expects that the synthetic composition of the narration may not be completed by the delivery time of the narration, it may deliver auxiliary data such as BGM and/or CMs that have already been prepared so as to fill the blank time period. Such auxiliary data may be referred to as static data whereas the narration that needs to be synthetically composed may be referred to dynamic data. In this way, it can deal with the situation in a very flexible way. Thus, the client apparatus 6 that has issued a request for delivery of contents on an on-demand basis does not need to be exposed to a situation where it does not receive any response for a long period of time, thereby avoiding a problem that the user terminates the use of the service because of long waiting time.

The narration synthesizer device 4 is adapted to respond to the purpose and the quantity of the narration that is required to be provided by it. It has narration templates that are suited for a certain structure of narration along with data on words and set phrases that are to be used as narration parts. It synthetically composes a narration by arranging word data and set phrase data in a selected template. With this arrangement, the workload of synthetically composing a narration is greatly reduced if compared with a case where the narration is composed as multimedia data from a very beginning.

Thus, the operation of synthetically composing a narration can be carried out in a relative short period of time so that it is possible to quickly and effectively handle a plurality of requests for delivering contents that are issued almost simultaneously. Particularly, while the operation of composing a scenario normally involves the use of a highly complex algorithm if compared with the operation of composing a narration other than a scenario, this embodiment is adapted to utilize a narration template for a scenario so that it is not necessary to execute such a complex algorithm and hence the operation of synthetically composing the scenario can be carried out in a short period of time.

Furthermore, the narration synthesizer device 4 controls narration parts including narration templates, word data and set phrase data in a narration DB 45 so that it can quickly draw out narration parts including a template, words and set phrases that are suited for the narration to be composed. This means that the time period required for collecting data in a narration synthesizing operation can be reduced remarkably so that the operation of synthetically composing a narration can be carried out effectively and efficiently in a short period of time.

A plurality of attributes can be specified for a narration template in terms of the internal components that are sequentially arranged and such attributes can be used as requirements to be met when selecting words and phrases as components. Thus, the words and phrases to be put in the template can be selected by referring to the attributes of the template to further reduce the time period necessary for collecting data in the operation of synthetically composing a narration.

The narration synthesizer device 4 has material data to be used for synthesizing new words and phrases so that it can synthesize new words and phrases that are not stored in the narration DB 45 whenever necessary for the purpose of synthetically composing a narration quickly and effectively.

The narration synthesizer device 4 utilizes assessment tables with which it can accurately estimate the time period necessary for synthetically composing a narration from the viewpoint of the capacity of the CPU, the number of words that may be used, the size and the duration of the narration and so on. Particularly, the assessment tables are modified on the basis of the statistic values obtained as a result of each operation of synthetically composing a narration so that the narration synthesizer device 4 can estimates the time period necessary for synthetically composing the next narration more accurately.

Second Embodiment

Now, the second embodiment of the invention will be described below by referring to FIGS. 25 through 27.

The second embodiment differs from the first embodiment only in terms of the flow of processing operations. In other words, it comprises a program control device 3, a narration synthesizer device 4, a contents delivery apparatus 5 and a client apparatus 6 that are identical with their counterparts of the first embodiment. Therefore, the configuration of the second embodiment will not be described any further and only the flow of processing operation will be discussed below.

In this second embodiment again, upon receiving a request for a program from the client apparatus 6, the program control device 3 browses the contents delivery apparatus 5 for contents and selects contents on the basis of the obtained results of the browsing operation. Then, it requests the narration synthesizer device 4 to synthetically compose narrations and draws up a program on the basis of the reception/response information transmitted back from the narration synthesizer device 4, which program is then delivered to the client apparatus 6. Thus the basic sequence of operation of this embodiment is same as that of the first embodiment.

The second embodiment differs from the first embodiment in that, firstly, upon receiving a request for a program from the client apparatus 6, the program control device 3 performs a reception/response operation and transmits a reception number to the client apparatus 6 before delivering a program to the latter. Thereafter, the client apparatus 6 can request the program control device 3 a program, using the reception number.

Secondly, while the program control device 3 of the first embodiment transmits the program 108 that contains information necessary for delivering all the contents and the auxiliary data (narrations) to the client apparatus 6, the program control device 3 of this embodiment draws up a separate program for delivering a single set of contents and the related narrations and transmits such separate programs individually to the client apparatus 6.

More specifically, as the user operates the client apparatus 6 to issue a request for delivering a program to the program control device 3 (Step S41), program request information 101 is transmitted from the client apparatus 6 as in the case of the first embodiment.

Then, the program request information 101 is received by the delivery request acquisition section 31 of the program control device 3. Then, the contents data retrieval section 32 browses the client control DB 35 according to the received information and refers to the attribute information of the user (Step S42).

Subsequently, as in the case of the first embodiment, the contents data retrieval section 32 issues a request for retrieving contents (retrieval request information 102) to the contents delivery apparatus 5 (Step S43) and the retrieval information reception section 51 of each of the contents delivery apparatus 5 browses the profile table 551 of the contents DB 55 on the basis of the retrieval request information 102 (Step S44).

Then, the results of retrieval reporting section 52 of each of the contents delivery apparatus 5 sends a report on the results of the retrieval information 103 to the program control device 3 (Step S45).

Upon receiving the results of retrieval information 103 from the contents delivery apparatus 5, the program control device 3 firstly transmits reception/response information to the client apparatus 6 (Step S46) unlike that of the first embodiment. More specifically, it transmits a reception number that is allocated unequivocally to each program request. The reception number is recorded in the client control DB 35 of the program control device 3 as a number corresponding to the user number of the user who issued the request.

As the client apparatus 6 receives the reception number, it writes and stores the number in the storage medium (Step S47).

On the other hand, after transmitting the reception/response information, the program control device 3 starts drawing up a first program (program A) (Step S48). If there is a narration (narration A) to be used in the first program, the program control device 3 requests the narration synthesizer device 4 to synthetically compose the narration A (Step S49).

The narration synthesizer device 4 computationally determines the time period necessary for synthetically composing the requested narration A on the basis of the request for synthetically composing the narration A (narration A request information) as in the case of the first embodiment (Step S50).

Then, the reception/response information transmission section 44 transmits the results of the estimation back to the program control device 3 (Step S51).

Simultaneously with the operation of transmitting the results of estimation back to the program control device 3, the narration synthesizer device 4 starts synthetically composing the narration A (Step S52).

On the other hand, upon receiving the results of estimation, the program drawing-up section 33 performs a necessary adjustment operation of putting them in the program A being drawn up, referring to the duration of the narration, the URL information and other information (Step S53). When the operation of drawing up the program A is completed (Step S54), the program control device 3 waits for the request for delivering the program A that will be transmitted from the client apparatus 6.

Then, the client apparatus 6 stores the reception number (Step S47). Subsequently, the client apparatus 6 transmits the reception number and requests delivery of the program A (Step S55).

As the program control device 3 receives the reception number, it refers to the client control DB 35 to confirm that the number is stored there (Step S56). After the confirmation of the reception number, the program transmission section 34 transmits the program A that describes the sequence of transmission of the first contents data and narration data to the client apparatus 6 (Step S57). When the client apparatus 6 receives the program A, it starts requesting delivery of contents according to the program A (Step S58).

Figure 26:
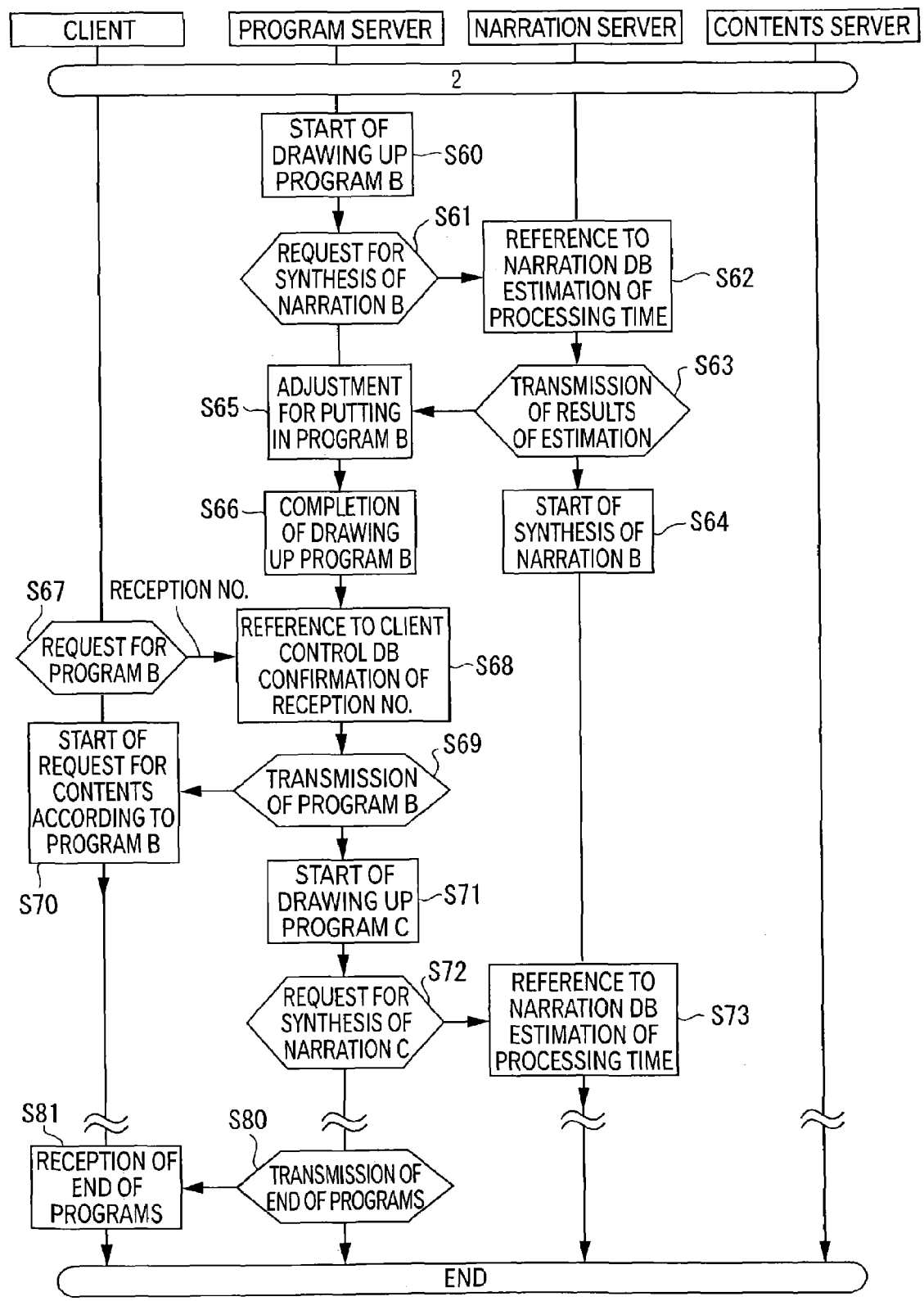
FIG. 26 is a flowchart of processing operation of the second embodiment of the invention that comes after the flowchart of FIG. 25.

After transmitting the program A to the client apparatus 6, the program control device 3 starts drawing up the second program (program B), following the sequence of operation same as that of the first program as shown in FIG. 26, to prepare for the coming request for the program (Step S60). In other words, while the client apparatus 6 is receiving the delivery of contents according to the program A, the program control device 3 synthetically composes the narration B to be used in the second program and draws up the program B.

More specifically, simultaneously with the operation of drawing up the program A, the processing operations of requesting synthesis of the narration B by the program control device 3 (Step S61), computationally determining the estimated time period necessary for the narration synthesizer device 4 to synthetically compose the narration (Step S62), transmitting the outcome of the estimation (Step S63), starting synthesis of the narration B (Step S64), adding information necessary to the program B being drawn up and making necessary adjustment by the program control device 3 (Step S65) and completion of drawing up the program B (Step S66).

When the operation of delivering contents to the client apparatus 6 according to the program A is over and the client apparatus 6 transmits the reception number to request the program B (Step S67), the program control device 3 refers to the client control DB 35 to confirm the reception number (Step S68), and transmits the program B to the client apparatus 6 (Step S69).

As the client apparatus 6 receives the program B, it starts requesting delivery of contents according to the program B (Step S70).

The program control device 3 starts drawing up the third program (program C) (Step S71) and repeats the processing operations of requesting synthesis of the narration C (Step S72), computationally determining the estimated time period necessary for synthetically composing the narration C (Step S73) and so on as described above for the programs A and B.

The above sequence of processing operation is terminated when the program control device 3 notifies the client apparatus 6 of completion of transmission of all the programs (Step S80) and the client apparatus 6 receives the notification (Step S81). It will also be terminated when the user notifies the program control device 3 of suspension of delivery of programs by operating the client apparatus 6.

Figure 25:
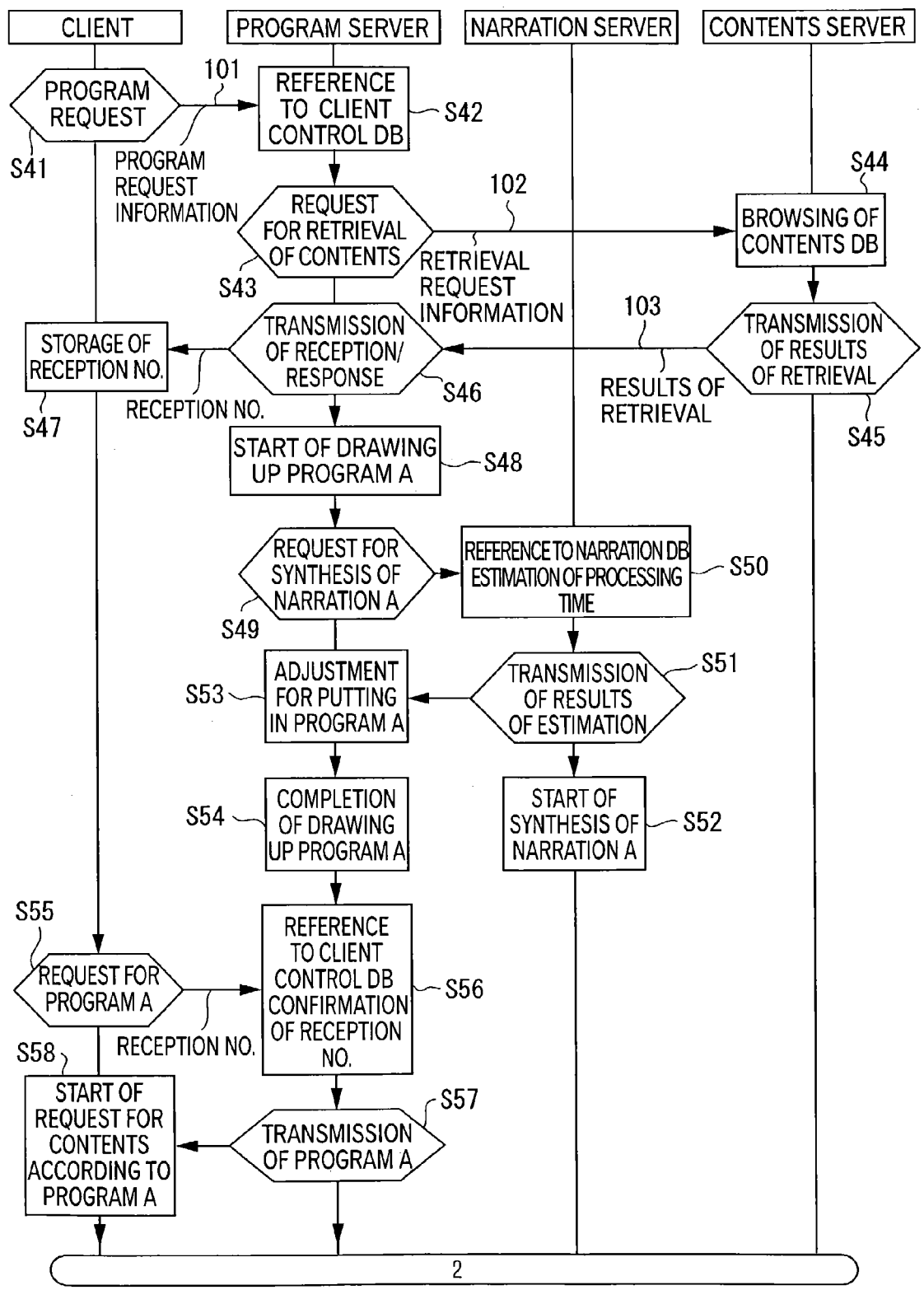
FIG. 25 is a flowchart of processing operation of the second embodiment of the invention.
Figure 27:
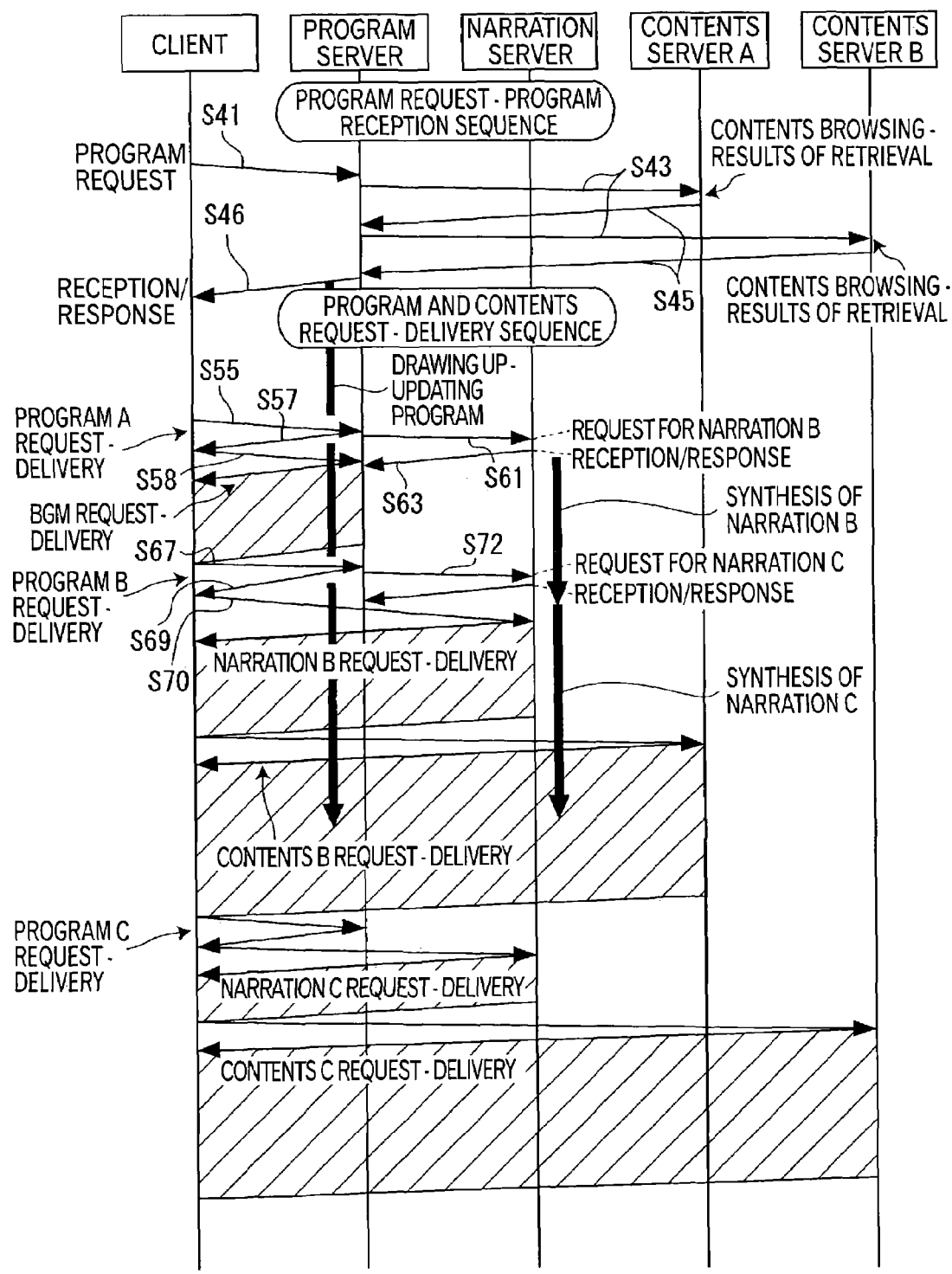
FIG. 27 is flowchart of processing operation for issuing a request for a program and contents and delivering the program and the contents of the second embodiment.

FIG. 27 will not be described here because it specifically illustrates the flow of operation of the client apparatus 6 for requesting programs and processing the delivery of contents as a part of the processing operations shown in FIGS. 25 and 26.

[Advantages of Second Embodiment]

According to the present embodiment, the same advantages in the first embodiment may be obtained. Additionally, since the program control device 3 delivers programs in pieces to the client apparatus 6 programs may be drawn-up in a more flexible way than the first embodiment in which the program is delivered with the sequence of delivery of all the contents and auxiliary data being determined.

More specifically, the program control device 3 and the client apparatus 6 communicate with each other periodically for the purpose of delivering programs and hence it is possible to reselect contents to exactly meet the demand of the user and dynamically add auxiliary data such as newest recommended contents and/or CM contents as well as current news on a quasi-real time basis. Thus, it is possible to provide most real-time contents delivery services.

Additionally, the program control device 3 requests the narration synthesizer device 4 to synthetically compose only one or more than one narrations that are necessary for each program at a time. Therefore, the narration synthesizer device 4 can perform processing operations of synthetically composing narrations with temporal dispersion to reduce its workload. Thus, if a number of requests for synthetically composing narrations are issued simultaneously from a plurality of client apparatus 6, the processing operations of composing narrations can be conducted in parallel for the client apparatus 6 without problem so that the possible reduction of efficiency that can arise when a plurality of client apparatus 6 issues requests for delivery of contents can be minimized.

[Modifications to the Embodiments]

The present invention is by no means limited to the above described embodiments, which may be modified and/or altered without departing from the scope of the present invention.

For instance, programs are delivered to a client apparatus 6 and the client apparatus 6 accesses the program control device 3 to receive contents and auxiliary data delivered to it in each of the above described embodiments. However, it may alternatively be so arranged that the program control device 3 additionally has a contents transmission section that issues data transmission commands to the narration synthesizer device 4 and the contents delivery apparatus 5 according to the drawn up programs, although it is advantageous to transmit programs to the client apparatus 6 from the viewpoint of reducing the load of the program drawing-up apparatus 2.

The type of contents that are delivered by a program providing system according to the invention is not limited to music data, and may include images and character information such as news. It is possible to change contents that meet the needs of the user.

Further, auxiliary data are not limited to narration data. For example, images and character information may be transmitted to the client apparatus 6 as auxiliary data and displayed on the display screen of the apparatus 6 while music data are being delivered. Similarly, BGM may be delivered as auxiliary data while news are being delivered.

The types of contents data and those of auxiliary data may be defined when the contents delivery business is started.

The configuration of the program drawing-up apparatus 2 is not limited to those of the above described embodiments. For example, the functions of the program control device 3 and those of the narration synthesizer device 4 may be combined and put in a single server device. The program drawing-up apparatus 2 may further include the functional features of the contents delivery apparatus 5.

While each of the program control device 3, the narration synthesizer device 4 and the contents delivery apparatus 5 is realized by installing computer programs in a server device, it may alternatively be realized by installing corresponding hardware elements.

The client apparatus 6 is not limited to the one described above in terms of the embodiments and a mobile phone, a PDA or a car navigation device may alternatively be used for it. Then, information specific to such a device may be added to the delivery request information transmitted from the client apparatus 6. For example, if a car navigation device is utilized for the client apparatus 6 and the user is driving along a sea coast with the car navigation device, it may be so arranged that the client apparatus automatically adds a request for tunes that may sound comfortable to the listener driving along a sea cost when the client apparatus transmits a delivery request because it can acquire information on the current location.

The configuration, each piece of information, and the procedure for drawing-up a program for implementing the present invention may be different from their counterparts of the above described embodiments as long as the object of the present invention can be achieved.

What is claimed is:

1. A program drawing-up method comprising:
   a step of registering client information on a user in advance;
   a step of acquiring a delivery request from a client apparatus;
   a step of acquiring the client information based on the delivery request;
   a step of retrieving contents data according to the delivery request and the client information;
   a step of generating auxiliary data to be delivered in combination with the retrieved contents data based on the retrieved contents data and the client information; and
   a step of drawing up a program indicating the sequence of delivery of the contents data and the auxiliary data according to the delivery request, wherein:
   the contents data retrieving step acquires data on the results of retrieval including information on the storage locations of the retrieved contents data,
   the program drawing-up step acquires the information on the storage locations of the contents data and information on the storage locations of the auxiliary data generated by the auxiliary data generation section and draws up a program, sequentially arranging the pieces of information on the storage locations in the order of delivery,
   the data on the results of retrieval include information on the storage locations of the contents data and contents profile information relating to the retrieved contents data,
   the auxiliary data generating step generates auxiliary data, utilizing the contents profile information,
   the auxiliary data are narration data relating to the contents data, and
   the auxiliary data are narration data relating to a program prologue and a program epilogue.

2. A program providing system comprising:
   a program drawing-up apparatus, comprising:
   a client control data base that stores client information on a user;
   a delivery request acquisition section for acquiring a delivery request from a client apparatus;
   a client information acquiring section that acquires the client information based on the delivery request;
   a contents data retrieval section for retrieving contents data according to the delivery request and the client information;
   an auxiliary data generation section for generating auxiliary data to be delivered in combination with the contents data based on the retrieved contents data and the client information; and
   a program drawing-up section for drawing up a program indicating the sequence of delivery of the contents data and the auxiliary data according to the delivery request, wherein:
   the contents data retrieval section acquires data on the results of retrieval including information on the storage locations of the retrieved contents data,
   the program drawing-up section acquires the information on the storage locations of the contents data and information on the storage locations of the auxiliary data generated by the auxiliary data generation section and draws up a program, sequentially arranging the pieces of information on the storage locations in the order of delivery,
   the data on the results of retrieval include information on the storage locations of the contents data and contents profile information relating to the retrieved contents data,
   the auxiliary data generation section generates auxiliary data, utilizing the contents profile information,
   the auxiliary data are narration data relating to the contents data, and
   the auxiliary data are narration data also relating to a program prologue and a program epilogue;
   a contents delivery apparatus storing the contents data; and
   a client apparatus adapted to transmit a delivery request to the program drawing-up apparatus and receive contents data and auxiliary.

3. The program providing system according to claim 2, wherein
   the program drawing-up apparatus transmits a program drawn up by way of the program drawing-up section in response to the delivery request from the client apparatus; and
   the client apparatus receives the contents data delivered from the contents delivery apparatus and the auxiliary data delivered from the program drawing-up apparatus according to the received program.

4. The program providing system according to claim 2, wherein
   the program drawing-up apparatus causes the contents data from the contents delivery apparatus and the auxiliary data from the auxiliary data generation section to be transmitted to the client apparatus according to the sequence of delivery of the program drawn up by the program drawing-up section in response to the delivery request from the client apparatus.

5. A program providing computer program embodied in a recording medium in a manner readable by a computer, the program operating the computer as a program providing system according to claim 2.

6. A recording medium embodying a computer program in a manner readable by a computer, the program operating the computer as a program providing system according to claim 2.

7. The program providing system according to claim 2, wherein
   the contents profile information contains strings of words such as attributes and keywords characterizing the contents; and
   the auxiliary data generation section has templates for specifying the structures of various narrations, narration parts data including set phrases and words to be put in each template, a narration control database for controlling the narration parts data and narration material data to be used for preparing the narration parts data.

8. The program providing system according to claim 7, wherein
   the auxiliary data generation section generates the narration data by selecting a template suited for the delivery request from the client and putting set phrase data and word data in the template on the basis of the contents profile information.

9. A program providing method comprising:

a step of registering client information on a user in advance;

a step of acquiring a delivery request from a client apparatus;

a step of acquiring the client information based on the delivery request;

a step of retrieving contents data according to the delivery request and the client information;

a step of generating auxiliary data to be delivered in combination with the retrieved contents data based on the retrieved contents data and the client information;

a step of drawing up a program indicating the sequence of delivery of the contents data and the auxiliary data according to the delivery request; and a step for the client apparatus to receive the contents data delivered from the contents delivery apparatus and the auxiliary data delivered from the program drawing-up apparatus according to the sequence of delivery of the program, wherein:

the contents data retrieving step section acquires data on the results of retrieval including information on the storage locations of the retrieved contents data, the program drawing-un step acquires the information on the storage locations of the contents data and information on the storage locations of the auxiliary data generated by the auxiliary data generation section and draws up a program, sequentially arranging the pieces of information on the storage locations in the order of delivery, the data on the results of retrieval include information on the storage locations of the contents data and contents profile information relating to the retrieved contents data, and the auxiliary data generating step generates auxiliary data, utilizing the contents profile information;

the auxiliary data are narration data relating to the contents data; and the auxiliary data are narration data relating to a program prologue and a program epilogue.

* * * * *